US010759977B2

(12) United States Patent
Yalalov et al.

(10) Patent No.: US 10,759,977 B2
(45) Date of Patent: Sep. 1, 2020

(54) POLYMER COMPOSITION FOR ADHESION APPLICATIONS

(71) Applicant: BOREALIS AG, Vienna (AT)

(72) Inventors: Denis Yalalov, Stenungsund (SE); Carl-Gustaf Ek, Vastra Frolunda (SE); Anil Sonmez, Vienna (AT); Ola Fagrell, Vienna (AT)

(73) Assignee: BOREALIS AG (AT)

( * ) Notice: Subject to any disclaimer, the term of this patent is extended or adjusted under 35 U.S.C. 154(b) by 0 days.

(21) Appl. No.: 16/303,052

(22) PCT Filed: May 24, 2017

(86) PCT No.: PCT/EP2017/062493
§ 371 (c)(1),
(2) Date: Nov. 19, 2018

(87) PCT Pub. No.: WO2017/207370
PCT Pub. Date: Dec. 7, 2017

(65) Prior Publication Data
US 2019/0218380 A1    Jul. 18, 2019

(30) Foreign Application Priority Data

Jun. 3, 2016 (EP) .................................. 16173002

(51) Int. Cl.
| | | |
|---|---|---|
| C09J 123/08 | (2006.01) |
| C08L 23/08 | (2006.01) |
| B32B 27/32 | (2006.01) |
| C08K 5/00 | (2006.01) |
| B32B 7/12 | (2006.01) |
| B32B 15/04 | (2006.01) |
| C08K 5/42 | (2006.01) |
| C09J 11/08 | (2006.01) |

(52) U.S. Cl.
CPC ......... *C09J 123/0892* (2013.01); *B32B 27/32* (2013.01); *C08K 5/0016* (2013.01); *C08L 23/0869* (2013.01); *C08L 23/0892* (2013.01); *C09J 123/0869* (2013.01); *B32B 7/12* (2013.01); *B32B 15/043* (2013.01); *C08K 5/0025* (2013.01); *C08K 5/42* (2013.01); *C08L 2312/00* (2013.01); *C09J 11/08* (2013.01)

(58) Field of Classification Search
CPC ............................. C09J 123/069; C09J 143/04
See application file for complete search history.

(56) References Cited

U.S. PATENT DOCUMENTS

| 5,210,150 A * | 5/1993 | Prejean ..................... C08F 8/42 |
| | | 525/100 |
| 5,331,049 A | 7/1994 | Audett et al. |
| 2011/0104488 A1 | 5/2011 | Muessig et al. |
| 2015/0240135 A1 | 8/2015 | Janke et al. |

FOREIGN PATENT DOCUMENTS

| CN | 102051145 A | 5/2011 |
| EP | 736065 B1 | 2/2000 |
| EP | 1309632 B1 | 4/2005 |
| JP | 59-24769 A | 2/1984 |
| JP | 03-504987 A | 10/1991 |
| JP | H07-504356 A | 2/1995 |
| JP | 2002-235048 A | 8/2002 |
| JP | 2007-509473 A | 4/2007 |
| JP | 2011-99099 A | 5/2011 |
| JP | 2013-36040 A | 2/2013 |
| JP | 2013-231113 A | 11/2013 |
| WO | 89/11514 A1 | 11/1989 |
| WO | 96/10615 A1 | 4/1996 |
| WO | 2009/056409 A1 | 5/2009 |
| WO | 2011/160964 A1 | 12/2011 |
| WO | 2013/159942 A2 | 10/2013 |
| WO | 2016/041926 A1 | 3/2016 |

OTHER PUBLICATIONS

Heino, E-L, et al., "Rheological Characterization of Polyethylene Fractions", Proc. Xlth Int. Congr. on Rheology, Brussels, Belgium, Aug. 17-21, 1992, pp. 360-362.
Heino, "The influence of molecular structure on some rheological properties of polyethylene", Annual Transactions of the Nordic Rheology Society, vol. 3, 1995.
Kaye et al., "Definition of Terms Relating to the Non-Ultimate Mechanical Properties of Polymers", Pure & Appl. Chem., vol. 70, No. 3, pp. 701-754, 1998.
Randall, James, "A Review of High Resolution Liquid 13 Carbon Nuclear Magnetic Resonance Characterizations of Ethylene-Based Polymers", Rev. Macromol. Chem. Phys., C29(2 & 3), 201-317 (1989).
Klimesch R., et al., "Polyethylene: High-pressure", Encyclopedia of Material Science and Technology, 2001, pp. 7181-7184.
Encyclopedia of Polymer Science and Engineering, vol. 6 (1986), pp. 383-410.
Zweifel, et al., "Plastics Additives Handbook", 5th Edition, Department of Materials, Institute of Polymers, 2001.
Extended European Search Report for Application No. 16173002.3-1302, dated Aug. 11, 2016.
Office action for Australian Patent Application No. 2017273755, dated Aug. 30, 2019.
Office action for Japanese Patent Application No. 2018-558667, dated Sep. 17, 2019.
Office action for Chinese Patent Application No. 201780027404.1, dated Jan. 2, 2020.

* cited by examiner

Primary Examiner — Marc S Zimmer

(74) *Attorney, Agent, or Firm* — Tarolli, Sundheim, Covell & Tummino LLP

(57) ABSTRACT

The present invention relates to an ethylene polymer composition for use in adhesive applications, to an article comprising the ethylene polymer composition and to a process for producing said article.

19 Claims, 1 Drawing Sheet

POLYMER COMPOSITION FOR ADHESION APPLICATIONS

Figure 1A:
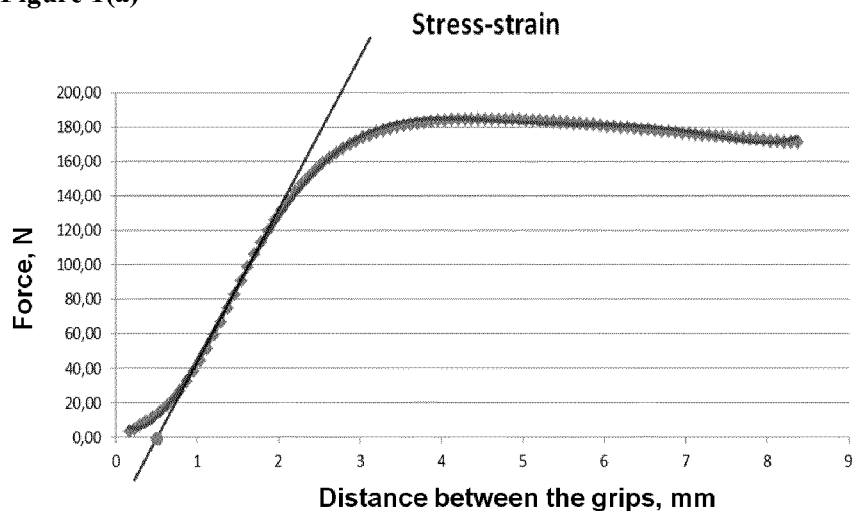

The present invention relates to an ethylene polymer composition for use in adhesive applications, to an article comprising the ethylene polymer composition and to a process for producing said article.

BACKGROUND

Polymer compositions for adhesive applications, like hot melt adhesive or pressure sensitive adhesive applications, are typically thermoplastic based adhesive compositions which are solid at room temperature, but melt quickly upon heating and then, upon cooling, set forming a firm bond e.g. on a substrate. E.g. a hot melt adhesive composition offers the possibility of almost instantaneous bonding which makes it highly suitable for automated production processes.

A hot melt adhesive composition includes typically a base polymer as the main component and other components like for example one or more of a tackifying resin, a plasticizer including wax, an additive(s) and/or a filler.

Important characteristics of a hot melt adhesive composition include, in addition to adhesion properties, softening temperature, cohesion properties and compatibility with other materials, just to mention few properties. Depending on the final application an appropriate hot melt adhesive composition is chosen so that it fulfils the requirements for that specific final application.

The base polymer in a hot melt adhesive composition is typically e.g. a polyolefin (ethylene- or propylene-based polymer), a functionalised polyolefin (ethylene or propylene copolymer with reactive groups), a styrene block copolymer, an ethylene vinyl acetate, etc. The base polymer the main component provides most of the features linked to the cohesive properties of the final HMA compound, e.g. strength, toughness, impact resistance, flexibility and mechanical properties at elevated temperatures.

The cohesion property is believed to be highly important for a hot melt adhesive composition in order to bring a durable solution to substrate movements and conditions appearing during the expected lifetime of the bonded component. The cohesion property means that the bond formed by the adhesive composition e.g. between two surfaces to be bonded together in an article has structural integrity and properties which enable the bond to distribute and withstand the stresses and strains and also enable energy dissipation in the end application use of the article. The man skilled in the art knows that the dissipation of energy within the adhesive composition plays one of the key roles in the cohesion properties of such adhesive composition. I.e. when pulling or shearing apart two surfaces bonded together by means of an adhesive composition of an article, the force which can be contributed to dissipation is normally considerably larger compared to the force due to the surface energy and/or a chemical bond between the substrate and the adhesive composition. Thus, better energy dissipation within the adhesive composition leads to better cohesion properties which then results in better overall bond performance (practical adhesion properties) of such adhesive composition.

Moreover, the cohesion properties of an adhesive composition are essentially provided by the base polymer as the main component.

Inter alia flexibility and elasticity are typically the key properties to determine the cohesive performance of an adhesive composition, like a hot melt adhesive composition. Both properties can be expressed in terms of tensile properties of the composition or polymer, like Tensile strength at yield point (MPa) and strain at yield point. The elasticity is normally defined as the tendency of a material or article to return to its original shape after being deformed. For elastic materials this is often linked to the E-modulus and to properties measured up to the yield point of the material, e.g. the E-modulus of elasticity determined for any point on stress-strain curve up to the yield point of the material as the ratio of tensile stress/tensile elongation, at this particular point, and at the yield point corresponding to the ratio of tensile stress at yield/tensile elongation at yield. The ratio is in fact corresponding to the Secant E-modulus when e.g. defined at a specific strain value.

Moreover, good flexibility and tailored elasticity level typically contribute to reduce the pulling force per unit area and to reduce the chances of the crack propagating within a hot melt adhesive composition. This means that said properties contribute in distributing and dissipating the pulling force thereby decreasing the failure of the overall adhesion capability in a hot melt adhesive composition.

Accordingly, the choice of the base polymer is vital in particular for the cohesion properties of the final adhesive composition. As the main component the base polymer typically provides the backbone to the adhesive composition and thus primary mechanical properties such as strength, like in tension and in shear, flexibility and elasticity and, normally, provides also the basis for the heat resistance to the adhesive, like hot melt adhesive, composition.

Additionally, it is important, but challenging, that an adhesive, like hot melt adhesive, composition provides both good cohesion and adhesive performance in order or meet the demands as a bond between two substrates in various end applications.

For example, if both the adhesive strength and the cohesive strength is high, the overall bond performance could despite this observation be poor; the bond needs also to show sufficient flexibility and energy dissipation (cohesive properties both) which are key ingredients for a good bond performance. Both the flexibility and the energy dissipation are important to enable movement and elimination of unnecessary high stresses in the bond between the substrates in the final composite part or product, due to stresses and strains applied to the composite part during its use in the application and during the entire lifetime of the product, e.g. via mechanical load or different thermal expansion coefficients of the various substrates.

The elastic recovery, i.e. the ability to recover in the same manner as an ideal rubber material is a most important feature for adhesive compounds. Particularly for structural bonding, construction, automotive and assembly etc., it is key that the bonded composite parts are strong as well as flexible and being able to recover back to its original shape after subject to high stress or substantial deformation and this particularly at elevated temperatures. The ability of the bond to recover to the original shape after stresses or strains are released is most often needed irrespective of how elastic or flexible to the bond is designed to be. For example, for comparatively rigid substrates like glass or steel or aluminium, the bond needs to be sufficiently elastic, flexible and allow energy dissipation during use of the composite product. However, if the bond is too elastic and too flexible, the structural integrity of the product could be jeopardized, meaning that the function of the product could be at risk if the dimensions are changed to a too large extent in the application. For comparatively flexible and low E-modulus substrates like e.g. textiles, soft polymers etc, the need for a bond with very flexible, soft and high elongation properties could be desirable. Practically, the type of substrates to be bonded and the application needs will determine the needs on the bond regarding flexibility, energy dissipation properties and ability to deform in elongation and/or in shear mode with low or high stresses. The ability of the bond to recover to its original shape after deformation is however almost always needed.

Accordingly, in addition to the cohesion properties, the base polymer contributes also to the adhesion properties based on the polymer structure and chemistry. However, conventionally in the state of the art, not only the base polymers, but also the other components, for instance tackifying resins, play a marked role for providing the adhesion properties for an adhesive, like hot melt adhesive, composition.

The hot melt adhesive compositions are used in a wide variety of applications, for example in combination with nonwoven materials such as for example disposable diapers and sanitary napkins, packaging such as for example case and carton sealing, bookbinding, bottle labelling, woodworking, textile and pressure sensitive application such as for example tapes, films and labels.

In the prior art for instance polyurethane (PUR) and moisture cured silane grafted amorphous polymer of alpha-olefin (APAO-R) has been used as the base polymer for adhesive compositions. The drawback of e.g. APAO-R is usually that only lower amounts, 0.5 wt % in maximum, of silane compound can usually be grafted thereto, which low silane content is not sufficient in many hot melt adhesive applications.

US20150240135 of Sika Technology discloses an adhesive composition suitable for vacuum laminating with uncoated aluminium tools [0030]. The composition comprises silane group-containing thermoplastic poly-alpha-olefin and at least one paraffin wax. The poly-alpha-olefin is defined in [0036] containing a priori no heteroatoms, such as oxygen, nitrogen or silicon, unless otherwise stated in the disclosure. Thus the silane compound, which can be e.g. vinyl trimethoxysilane, is introduced to the poly-alpha-olefin after the polymerisation thereof. The poly-alpha-olefin can be produced using Ziegler-Natta or metallocene catalyst and can be homopolymer of ethylene or homopolymer of propylene, see e.g. [0043-0046]. The introduction of the silane compound is carried out by grafting, see [0042]. Grafting is typically carried out by using a peroxide. The use of peroxide has drawbacks due the fact that e.g. simultaneously crosslinks the polyethylene causing an undesired increase in viscosity of the polyethylene component (worsens the processability and thus production rate of the composition). Moreover, the by-products of the peroxide may deteriorate the performance of the final end application, e.g. shorten the end use life of the article. The composition can additionally contain other poly-alpha-olefin polymer which does not contain silane groups, but which can contain e.g. (meth)acrylate comonomer or vinyl acetate, like EVA [0053]. The composition can further contain a catalyst that accelerates the reaction of silane groups (crosslinking), like organic phosphorous or tin compound [0057].

Accordingly, there is a continuous need to find new polymer compositions which would widen the product window in adhesive compositions and even improve the properties of the adhesive compositions during the production of articles and at the end use of thereof.

FIGURES

Figure 1B:
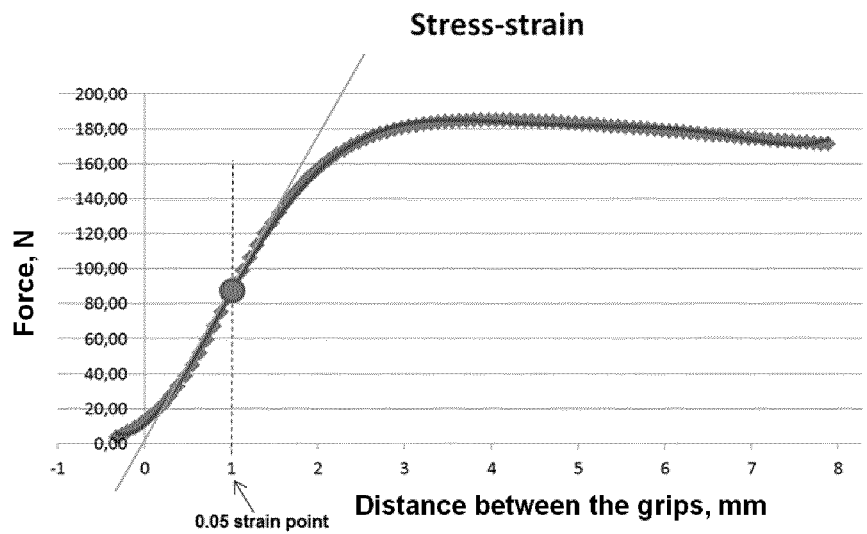

FIG. 1(a) and FIG. 1(b) illustrate the measurement point of Secant E-modulus, Tensile strength and the strain at offset yield point as described below in the specification including "Determination methods" and experimental part.

DESCRIPTION OF THE INVENTION

The present invention provides an ethylene polymer composition for adhesive applications which comprises, preferably consists of, (a) a polymer of ethylene containing one or more polar comonomer(s) selected from (C1-C6)-alkyl acrylate and (C1-C6)-alkyl (C1-C6)-alkylacrylate comonomer(s), wherein the polymer of ethylene (a) bears (b) silane group(s) containing units;

and which polymer composition further comprises
(c) additive(s); and
one or more, or all, of the components (d) to (g), in any combination:
(d) a tackifying resin;
(e) a plasticizer;
(f) a further component(s) other than the polymer of ethylene (a), additive (c), tackifying resin (d) and plasticizer (d); and/or
(g) a crosslinking agent.

The components (d) to (g) are different from the components (a) to (c). In other words, each component (a) to (g) is different from the others.

The ethylene polymer composition for adhesive applications of the invention as defined above, below or in claims is referred herein also shortly as "polymer composition", "composition" or "adhesive composition".

The expression "(a) a polymer of ethylene containing one or more polar comonomer(s) selected from (C1-C6)-alkyl acrylate and (C1-C6)-alkyl (C1-C6)-alkylacrylate comonomer(s), wherein the polymer of ethylene (a) bears (b) silane group(s) containing units" as defined above, below or in claims is referred herein also shortly as "polymer (a)".

The silane group(s) containing units (b) are referred herein also shortly as "units (b)" or as evident from the context.

It is understood that the silane group(s) containing units (b) are present, i.e. incorporated, in the polymer (a), and polymer (a), additive(s) (c) and the one or more, or all, of the components (d) to (f) are components present in the polymer composition of the invention.

Unexpectedly, the polymer (a) has i.a. advantageously good mechanical properties which make the polymer (a) highly suitable in polymer compositions for various adhesive applications, like in hot melt or pressure sensitive adhesive compositions. E.g. stiffness properties of the polymer (a), expressed e.g. as Secant E-modulus as given below, contribute to the key properties required for polymer compositions for adhesive applications, importantly, also in case the polymer (a) is crosslinked with a crosslinking agent. Preferably, the polymer (a) has said advantageous mechanical properties within wide temperature window ranging from cold to higher temperatures and, moreover, even in case crosslinking the polymer (a) using a crosslinking agent. Accordingly, the feasible mechanical properties of the polymer (a) provide cohesion properties that are very desirable for the adhesive compositions, like hot melt adhesive compositions.

Preferably the polymer (a) shows also highly advantageous elastic recovery indicating that the polymer provides high resistance against permanent deformation performance under high thermal load and mechanical stress performance as shown in experimental part. Elastic recovery is expressed in the experimental part as Hot-Set—Elastic recovery (Permanent deformation).

Moreover, the polymer (a) preferably enables to use the adhesive composition in wide temperature range, especially also at high temperatures, and thereby can provide a broad end application window to the adhesive composition.

Also preferably, the polymer (a) has low secant E-modulus ratio between different temperatures indicating a uniform performance along a wide temperature range.

Furthermore, the polymer (a) can preferably contribute to adhesion properties of the adhesive composition. Accordingly, the use of polymer (a) may enable, if desired in some adhesive applications, to reduce the amounts of the other conventional components commonly used in the adhesive compositions, e.g. tackifying resin and waxes.

Preferably, the polymer composition for adhesive applications comprises, preferably consists of, (a) a polymer of ethylene containing one or more polar comonomer(s) selected from (C1-C6)-alkyl acrylate and (C1-C6)-alkyl (C1-C6)-alkylacrylate comonomer(s), wherein the polymer of ethylene (a) bears (b) silane group(s) containing units;

and which polymer composition further comprises (c) additive(s); and one or more, or all, of the components (d) to (g), in any combination:

(d) a tackifying resin;

(e) a plasticizer;

(f) a further component(s) other than the polymer of ethylene (a), additive (c), tackifying resin (d) and plasticizer (d); and/or (g) a crosslinking agent and wherein the polymer of ethylene (a) has one or two of the following properties:

a Secant E-modulus at −20° C. (for strain 0.05) of at least 20 MPa when measured from Dumbbell specimens consisting of a polymer of ethylene (a) (ISO 527-2/5A/250, as described in the specification under "Determination Methods"); and/or a Secant E-modulus at −20° C. (for strain 0.05) of at least 35 MPa when measured from Dumbbell specimens consisting of a crosslinked polymer of ethylene (a) (ISO 527-2/5A/250, cross-linked at 90° C. in water bath for 16 hrs as described in the specification under "Determination Methods").

E-modulus is expressed herein as "secant E-modulus" at a temperature as indicated above or below and for strain 0.05. The sample of polymer of ethylene (a) is either non-crosslinked (natural, i.e. as is) or crosslinked.

E-modulus is expressed herein as "secant E-modulus" at a temperature as indicated above or below and for strain 0.05. The sample of polymer of ethylene (a) is crosslinked, as described under "Determination Methods".

The term "a Secant E-modulus at 23° C. or 95° C. (for strain 0.05) of" means: Straight line is fitted between origin and the point on stress-strain curve corresponding to 0.05 of strain, as shown in FIG. 1(b), and the secant E-modulus corresponds to the slope of this line.

The term "strain 0.05" means: First, since the stress-strain curves of the polymer (a) of the present invention do not demonstrate a linear elastic behaviour, the best fit straight line was applied to the steepest slope of the curve and the cross-section point on x-axis taken as a new origin of the curve, i.e. at this point x-Axis=0 and y-Axis=0, compare FIG. 1(a), so that the stress-strain curve can be represented as shown on FIG. 1(b). No extensometer was used.

The changes of the distance between the crosshead grips holding the specimen is noted and taken as changes of specimen gauge length according to ISO 527-2/5A. The initial gauge length of the specimen, i.e. 20 mm at the initial point of the stress-strain curve, is used as the initial length of the specimen in the strain calculation. This means herein that the change of the distance between the grips of 1 mm corresponds to a specimen strain of 0.05. The automatic data recording on tensile machine always started once the load reached 2N (so called preload).

The polymer composition is preferably used in hot melt adhesive applications, which term has a well-known meaning.

The polymer (a) of the composition can be crosslinked via the silane group(s) containing units (b), if desired. Moreover, the polymer composition can be used in both non-crosslinked and crosslinked adhesive applications, i.e. without crosslinking or crosslinking the polymer (a) via the silane group(s) containing units (b) using a crosslinking agent (g). The crosslinking of the polymer (a) can further contribute to the mechanical properties (as mentioned above or below) of the polymer composition both at low and high temperatures, which are desirable for an adhesive composition. Accordingly the polymer composition broadens the adhesive application window.

In one embodiment the crosslinking agent (g) is not present in the polymer composition as defined above, below or in claims.

In another embodiment the crosslinking agent (g) is present in the polymer composition as defined above, below or in claims.

Preferably, the crosslinking agent (g) is present in the polymer composition. In this preferable embodiment, the crosslinking agent (g) crosslinks the polymer composition, preferably crosslinks at least the polymer (a). Accordingly, the crosslinking thus further contributes i.a. to the broad temperature range window of the polymer composition which is desired in various adhesive applications.

The invention further provides an adhesive composition comprising the polymer composition of the invention as defined above, below or in claims.

The invention further provides an article comprising at least one substrate and a polymer composition, as defined above, below or in claims, on said substrate.

Preferably the article of the invention comprises a multilayer element comprising a substrate, an adhesive layer on said substrate and a top layer on said adhesive layer;

wherein the adhesive layer comprises the ethylene polymer composition as defined above, below or in claims.

The invention further provides an adhesive layer which comprises, preferably consists of, the polymer composition of the invention. The adhesive layer has well known meaning and functions to adhere two separate components, like two separate layers together. Accordingly adhesive layer is between these two components, like two separate layers, for adhering purpose.

The invention further provides a process for producing the article as defined above, below or in claims.

The following preferable embodiments, properties and subgroups of the polymer composition, of the polymer (a) and silane group(s) containing units (b) thereof, of the other components (c) to (g), of the adhesive composition, of the article of the invention, as well as of the production process of the article of the invention are independently generalisable so that they can be used in any order or combination to further define the suitable embodiments of the invention.

Polymer (a), Silane Group(s) Containing Units (b), Components (c) to (g) and the Polymer Composition The preferable polymer composition as defined above comprises, preferably consists of, (a) a polymer of ethylene containing one or more polar comonomer(s) selected from (C1-C6)-alkyl acrylate and (C1-C6)-alkyl (C1-C6)-alkylacrylate comonomer(s), wherein the polymer of ethylene (a) bears (b) silane group(s) containing units;

and which polymer composition further comprises (c) additive(s); and one or more, or all, of the components (d) to (g), in any combination:

(d) a tackifying resin;

(e) a plasticizer;

(f) a further component(s) other than the polymer of ethylene (a), additive (c), tackifying resin (d) and plasticizer (d); and/or (g) a crosslinking agent and wherein the polymer of ethylene (a) has one or two of the following properties:

a Secant E-modulus at −20° C. (for strain 0.05) of at least 20 MPa when measured from Dumbbell specimens consisting of a polymer of ethylene (a) (ISO 527-2/5A/250, as described in the specification under "Determination Methods"); and/or a Secant E-modulus at −20° C. (for strain 0.05) of at least 35 MPa when measured from Dumbbell specimens consisting of a crosslinked polymer of ethylene (a) (ISO 527-2/5A/250, cross-linked at 90° C. in water bath for 16 hrs as described in the specification under "Determination Methods").

The polymer composition as defined above, below or in claims preferably comprises:

10.0 to 80.0 wt %, preferably 20.0 to 70.0, preferably 20.0 to 60.0, preferably 25 to 50, wt % of a polymer of ethylene (a) bearing silane group(s) containing units (b);

0.01 to 5.0 wt %, preferably 0.05 to 4.0, preferably 0.05 to 3.0, preferably 0.01 to 2.0, wt % of additive(s) (c); and one or more, or all, of the components (d) to (g), in any combination:

0 to 70 wt %, preferably 0 to 60, preferably 0 to 55, preferably 0 to 50, wt % of a tackifying resin (d);

0 to 50 wt %, preferably 0 to 40, preferably 0 to 30, preferably 0 to 20, wt % of a plasticizer (e);

0 to 50 wt %, preferably 0 to 40, preferably 0 to 30, wt % of a further component(s) (f) other than the polymer of ethylene (a), additive (c), tackifying resin (d) and plasticizer (d); and/or 0 to 0.1, preferably 0.00001 to 0.1, mol/(kg polymer of ethylene (a)) of a crosslinking agent (g); based on the total amount (100 wt %) of the polymer composition.

The polymer composition as defined above, below or in claims preferably comprises:

10.0 to 80.0 wt %, preferably 20.0 to 70.0, preferably 20.0 to 60.0, preferably 25 to 50, wt % of a polymer of ethylene (a) bearing silane group(s) containing units (b);

0.01 to 5.0 wt %, preferably 0.05 to 4.0, preferably 0.05 to 3.0, preferably 0.01 to 2.0, wt % of additive(s) (c); and one or more, or all, of the components (d) to (g), in any combination:

0 to 70 wt %, preferably 0 to 60, preferably 0 to 55, preferably 0 to 50, wt % of a tackifying resin (d);

0 to 50 wt %, preferably 0 to 40, preferably 0 to 30, preferably 0 to 20, wt % of a plasticizer (e);

0 to 50 wt %, preferably 0 to 40, preferably 0 to 30, wt % of a further component(s) (f) other than the polymer of ethylene (a), additive (c), tackifying resin (d) and plasticizer (d); based on the total amount (100 wt %) of the polymer composition; and/or 0 to 0.1, preferably 0.00001 to 0.1, mol/(kg polymer of ethylene (a)) of a crosslinking agent (g); based on the total amount (100 wt %) of the polymer composition;

and wherein the polymer of ethylene (a) has one or two of the following properties:

a Secant E-modulus at −20° C. (for strain 0.05) of at least 20 MPa when measured from Dumbbell specimens consisting of a polymer of ethylene (a) (ISO 527-2/5A/250, as described in the specification under "Determination Methods"); and/or a Secant E-modulus at −20° C. (for strain 0.05) of at least 35 MPa when measured from Dumbbell specimens consisting of a crosslinked polymer of ethylene (a) (ISO 527-2/5A/250, cross-linked at 90° C. in water bath for 16 hrs as described in the specification under "Determination Methods").

It is evident that a skilled person can convert the "mol/(kg polymer of ethylene (a)) of a crosslinking agent (g)" to wt % based on the total amount (100 wt %) of the polymer composition depending on the choice of the crosslinking agent suitable for the desired end application, which choice of the crosslinking agent is also within the skills of a skilled person in the art. Thus naturally, the amounts of the components (a) to (g) are based on the total amount (100 wt %) of the polymer composition.

As to components of the polymer composition:

As well known "comonomer" refers to copolymerisable comonomer units.

Preferably, the polymer of ethylene (a) contains one polar comonomer selected from (C1-C6)-alkyl acrylate and (C1-C6)-alkyl (C1-C6)-alkylacrylate comonomer, more preferably from (C1-C6)-alkyl acrylate comonomer, more preferably from methyl acrylate, ethyl acrylate or butyl acrylate comonomer, wherein the polymer of ethylene (a) bears (b) silane group(s) containing units.

More preferably, the polymer (a) of the polymer composition as defined above, below or in claims, is without an alpha-olefin comonomer selected from linear straight-chain or branched aliphatic alpha-olefin or cycloaliphatic alpha-olefin.

The polar comonomer is preferably present in the polymer of ethylene (a) in an amount of 2.5 to 18 mol %, preferably of 2.5 to 15.0 mol %, preferably 4.5 to 12.5 mol %, preferably of 5.4 to 12.5 mol %, when measured according to "Comonomer contents" as described below under the "Determination methods".

The most preferred polar comonomer of polymer (a) is methyl acrylate. Without binding to any theory, for instance, methyl acrylate (MA) is the only acrylate which cannot go through the ester pyrolysis reaction, since does not have this reaction path. Therefore, the polymer (a) with MA comonomer does not form any harmful free acid (acrylic acid) degradation products at high temperatures, whereby polymer (a) of ethylene and methyl acrylate comonomer contribute to good quality and life cycle of the end article thereof. This is not the case e.g. with vinyl acetate units of EVA, since EVA forms at high temperatures harmful acetic acid degradation products. Moreover, the other acrylates like ethyl acrylate (EA) or butyl acrylate (BA) can go through the ester pyrolysis reaction, and if degrade, would form volatile olefinic by-products.

The polymer of ethylene (a) has preferably a Secant E-modulus at −20° C. (for strain 0.05) of 20 to 250, preferably 45 to 250, preferably 45 to 119, MPa when measured from Dumbbell specimens consisting of a polymer of ethylene (a) (ISO 527-2/5A/250, as described in the specification under "Determination Methods").

The polymer of ethylene (a) has preferably a Secant E-modulus at −20° C. (for strain 0.05) of 35 to 250, preferably 35 to 110, 35 to 110, 40 to 110, MPa when measured from Dumbbell specimens consisting of a cross-linked polymer of ethylene (a) (ISO 527-2/5A/250, cross-linked at 90° C. in water bath for 16 hrs as described in the specification under "Determination Methods").

The polymer of ethylene (a) has preferably a Secant E-modulus at 95° C. (for strain 0.05) of at least 0.1, preferably of 0.1 to 10, preferably 0.2 to 10, preferably 0.3 to 10, preferably 0.3 to 5, MPa when measured from Dumbbell specimens consisting of a crosslinked polymer of ethylene (a) (ISO 527-2/5A/250, cross-linked at 90° C. in water bath for 16 hrs as described in the specification under "Determination Methods").

The polymer of ethylene (a) has preferably a ratio of Secant E-modulus at −20° C. (for strain 0.05) to Secant E-modulus at 95° C. (for strain 0.05) (when measured from Dumbbell specimens consisting of a crosslinked polymer of ethylene (a) (ISO 527-2/5A/250, crosslinked at 90° C. in water bath for 16 hrs as described in the specification under "Determination Methods")) (referred herein also as Secant E-modulus ratio −20° C./95° C.) of 250 or less, preferably of 5.0 to 250, preferably of 5.0 to 200, preferably of 10 to 100.

The polymer of ethylene (a) has preferably a Secant E-modulus at 23° C. (for strain 0.05) of at least 10, preferable 10 to 250, preferably 10 to 100, 10 to 90, 11 to 50, MPa when measured from Dumbbell specimens consisting of a polymer of ethylene (a) (ISO 527-2/5A/250, as described in the specification under "Determination Methods").

The polymer of ethylene (a) has preferably a Secant E-modulus at 23° C. (for strain 0.05) of at least 10, preferably 10 to 250, preferably 10 to 100, preferably 11 to 90, preferably 11 to 60, MPa when measured from Dumbbell specimens consisting of a crosslinked polymer of ethylene (a) (ISO 527-2/5A/250, cross-linked at 90° C. in water bath for 16 hrs as described in the specification under "Determination Methods").

The polymer of ethylene (a) has preferably a Tensile strength at offset yield point (MPa) at −20° C. (for strain 0.05) of 10 or less, preferably of 1.0 to 8.0, preferably of 1.0 to 7.0, preferably of 1.0 to 6.0, preferably of 1.0 to 5.5, preferably 1.5 to 5.0, preferably of 2.0 to 4.0, MPa when measured from Dumbbell specimens consisting of a cross-linked polymer of ethylene (a) (ISO 527-2/5A/250, cross-linked at 90° C. in water bath for 16 hrs as described in the specification under "Determination Methods").

The polymer of ethylene (a) has preferably a Tensile strength at offset yield point (MPa) at 95° C. (for strain 0.05) of at least 0.01, preferably of 0.01 to 0.07, preferably of 0.015 to 0.07, MPa when measured from Dumbbell specimens consisting of a crosslinked polymer of ethylene (a) (ISO 527-2/5A/250, cross-linked at 90° C. in water bath for 16 hrs as described in the specification under "Determination Methods").

The polymer of ethylene (a) has preferably a ratio of Tensile strength at offset yield point (MPa) at −20° C. (for strain 0.05) to Tensile strength at offset yield point (MPa) at 95° C. (for strain 0.05) (when measured from Dumbbell specimens consisting of a crosslinked polymer of ethylene (a) (ISO 527-2/5A/250, cross-linked at 90° C. in water bath for 16 hrs as described in the specification under "Determination Methods")) (referred herein also as Tensile strength at offset yield point (MPa) ratio −20° C./95° C.) of less than 250, preferably of 10 to 250, preferably of 10 to 200, more preferably of 20 to 100.

The polymer of ethylene (a) has preferably
Flexibility$_{-20}$ (1/MPa$^2$) at −20° C. at least 15, when calculated according to the following equation (A_20):

$$\text{Flexibility}_{-20} = \text{SAY} * 100000/(\text{TSY}*E)(A_{-20})(\text{at }-20° \text{ C.}), \text{ and preferably}$$

Flexibility$_{+95}$ (1/MPa$^2$) at +95° C. of 900000 or less, when calculated according to the following equation (A$_{+95}$):

$$\text{Flexibility}_{+95} = \text{SAY} * 100000/(\text{TSY}*E)(A_{+95})(\text{at }+95° \text{ C.})$$

wherein in equation (A$_{-20}$) and equation (A$_{+95}$):

SAY is the strain at offset yield point=0.05 (at −20° C. and, respectively at +95° C.) (when measured from Dumbbell specimens consisting of a crosslinked polymer of ethylene (a) (ISO 527-2/5A/250, cross-linked at 90° C. in water bath for 16 hrs as described in the specification under "Determination Methods")), TSY is the tensile strength at offset yield point value (for strain 0.05, at −20° C. and, respectively at +95° C.), in MPa (when measured from Dumbbell specimens consisting of a crosslinked polymer of ethylene (a) (ISO 527-2/5A/250, cross-linked at 90° C. in water bath for 16 hrs as described in the specification under "Determination Methods")), and E is the Secant E-modulus value (for strain 0.05, at −20° C. and, respectively at +95° C.), in MPa (when measured from Dumbbell specimens consisting of a crosslinked polymer of ethylene (a) (ISO 527-2/5A/250, cross-linked at 90° C. in water bath for 16 hrs as described in the specification under "Determination Methods")).

The Flexibility$_{-20}$ (1/MPa$^2$) of the polymer (a) at −20° C. is preferably of 15 to 100, preferably 20 to 70.

The Flexibility$_{+95}$ (1/MPa$^2$) of the polymer (a) at 95° C. is preferably of 30000 to 900000, preferably of 30000 to 700000, preferably of 50000 to 500000, preferably 50000 to 400000.

The polymer of ethylene (a) has preferably
Modulus of resilience$_{-20}$ (MPa or J/m$^3$) at −20° C. of at least 2, when calculated according to the following equation (B$_{-20}$):

$$\text{Modulus of resilience}_{-20} = \text{TSY}^2/(2*E)(B_{-20}), \text{ and preferably}$$

Modulus of resilience$_{+95}$ (MPa or J/m$^3$) at +95° C. of at least 0.01, when calculated according to the following equation (B$_{+95}$):

$$\text{Modulus of resilience}_{+95} = \text{TSY}^2/(2*E)(B_{+95}),$$

wherein in equation (B$_{-20}$) and equation (B$_{+95}$):
TSY is the tensile strength at yield point value (for strain 0.05 at −20° C. and, respectively at +95° C.), in MPa (when measured from Dumbbell specimens consisting of a crosslinked polymer of ethylene (a) (ISO 527-2/5A/250, cross-linked at 90° C. in water bath for 16 hrs as described in the specification under "Determination Methods"))
and E is the Secant E-modulus value (for strain 0.05 at −20° C. and, respectively at +95° C.), in MPa (when measured from Dumbbell specimens consisting of a crosslinked polymer of ethylene (a) (ISO 527-2/5A/250, cross-linked at 90° C. in water bath for 16 hrs as described in the specification under "Determination Methods")).

The Modulus$_{-20}$ of resilience (MPa or J/m$^3$) at −20° C. of the polymer (a) is preferably of 2 to 100, preferably 5 to 60.

The Modulus$_{+95}$ of resilience (MPa or J/m$^3$) at +95° C. of the polymer (a) is preferably of 0.01 to 3, preferably of 0.03 to 2.

Typically, and preferably the density of the polymer of ethylene (a), is higher than 860 kg/m$^3$. Preferably the density is not higher than 970 kg/m$^3$, and preferably is from 920 to 960, preferably 930 to 960, preferably 940 to 955, kg/m$^3$, according to ISO 1872-2 as described below under "Determination Methods".

The polymer (a) has preferably a melt flow rate (MFR$_2$) of 0.1 to 500, preferably 0.1 to 150, preferably 0.5 to 50, preferably 0.5 to 20, g/10 min, when measured from a non-crosslinked polymer of ethylene (a) according to ISO 1133 at 190° C. and at a load of 2.16 kg.

The melting temperature (Tm) of the polymer (a) is preferably of 110 or less, preferably 70 to 110° C., preferably of 80 to 110° C., preferably of 84 to 100° C., when determined as described below under "Determination Methods".

The silane group(s) containing units (b) can be present as a comonomer of the polymer (a) or as a compound grafted chemically to the polymer (a). In general, copolymerisation of the silane group(s) containing comonomer to ethylene monomer and grafting of the silane group(s) containing units are well-known techniques and well documented in the polymer field and within the skills of a skilled person. Silane units (b) as comonomer are copolymerized together with ethylene monomer and polar comonomer during the polymerization process of the ethylene polymer (a). Grafting is incorporating the silane units (b) chemically (using e.g. peroxide) into the backbone after the polymerisation of the ethylene polymer (a).

Preferably the silane group(s) containing units (b) are present as a comonomer in the polymer (a). In this embodiment the polymer (a) is preferably produced by copolymerizing ethylene monomer in the presence of a polar comonomer and a silane group(s) containing comonomer. The copolymerization is preferably carried out in a high pressure reactor using a radical initiator.

The copolymerisation of the units (b) as the comonomer provides more uniform incorporation of the units (b) compared to grafting of the units (b). Moreover, compared to grafting, the copolymerisation does not require the addition of peroxide after the polymer is produced. Whereas grafting typically requires an addition of peroxide to the polyethylene polymer after the polymerization of the polymer. It is known that such peroxide addition brings limitations to the choice of MFR of the starting polymer (during grafting the MFR level of the starting polymer decreases), for the polymer composition to be suitable for an adhesive composition in the end application article. Furthermore, the by-products formed from peroxide during the grafting process can deteriorate the quality of the polymer at the end use application as adhesive composition, like in a hot melt adhesive composition.

The units (b) are preferably hydrolysable silane group(s) containing units. Such hydrolysable silane group(s) containing units (b) can be crosslinked, if desired. Accordingly, the silane group(s) containing comonomer or compound as the silane group(s) containing units (b) is suitably a hydrolysable unsaturated silane compound represented by the formula

$$R1SiR2qY3-q \qquad (I)$$

wherein

R1 is an ethylenically unsaturated hydrocarbyl, hydrocarbyloxy or (meth)acryloxy hydrocarbyl group, each R2 is independently an aliphatic saturated hydrocarbyl group, Y which may be the same or different, is a hydrolysable organic group and q is 0, 1 or 2.

Special examples of the unsaturated silane compound are those wherein R1 is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and R2, if present, is a methyl, ethyl, propyl, decyl or phenyl group.

Further suitable silane compounds or, preferably, comonomers are e.g. gamma-(meth)acryloxypropyl trimethoxysilane, gamma(meth)acryloxypropyl triethoxysilane, and vinyl triacetoxysilane, or combinations of two or more thereof.

As a suitable subgroup of unit of formula (I) is an unsaturated silane compound or, preferably, comonomer of formula (II)

$$CH2=CHSi(OA)3 \qquad (II)$$

wherein each A is independently a hydrocarbyl group having 1-8 carbon atoms, suitably 1-4 carbon atoms.

The silane group(s) containing units (b) of the invention, are preferably the comonomer of formula (I), preferably of formula (II), preferably vinyl trimethoxysilane, vinyl bismethoxyethoxysilane, vinyl triethoxysilane, more preferably vinyl trimethoxysilane or vinyl triethoxysilane.

The silane group(s) containing units (b) are preferably present in the polymer of ethylene (a) in an amount (mol %) of 0.06 to 2.0 mol %, preferably 0.1 to 1.6 mol %, preferably 0.2 to 1.4 mol %, preferably 0.2 to 1 mol %, preferably 0.24 to 0.8 mol %, more preferably of 0.3 to 0.8 mol %, preferably 0.3 to 0.5 mol %, when determined according to "Comonomer contents" as described below under "Determination Methods".

In preferable embodiment, the polymer (a) is a copolymer of ethylene with a (C1-C4)-alkyl acrylate comonomer and silane group(s) containing units (b) according to formula (I) as comonomer, more preferably and silane group(s) containing units (b) according to formula (II) as comonomer, more preferably and silane group(s) containing units (b) according to formula (II) selected from vinyl trimethoxysilane, vinyl bismethoxyethoxysilane, vinyl triethoxysilane or vinyl trimethoxysilane comonomer, as defined above or in claims. Most preferably the polymer (a) is a copolymer of ethylene with methyl acrylate comonomer and with vinyl trimethoxysilane, vinyl bismethoxyethoxysilane, vinyl triethoxysilane or vinyl trimethoxysilane comonomer, preferably with vinyl trimethoxysilane or vinyl triethoxysilane comonomer.

The polymer (a) of the polymer composition can be commercially available and/or can be prepared according to or analogously to known polymerization processes described in the chemical literature.

As to polymerization process, preferably, the polymerization process of the polymer of ethylene (a) is carried out in a high pressure polymerisation process using a radical initiator.

In a preferable embodiment the polymer (a) is produced by polymerising ethylene with one or more polar comonomer(s) and with silane group(s) containing comonomer (=silane group(s) containing units (b)) as defined above in a high pressure (HP) process using free radical polymerization in the presence of one or more initiator(s) and optionally using a chain transfer agent (CTA) to control the MFR of the polymer. The HP reactor can be e.g. a well-known tubular or autoclave reactor or a mixture thereof, suitably a tubular reactor. The high pressure (HP) polymerisation and the adjustment of process conditions for further tailoring the other properties of the polymer depending on the desired end application are well known and described in the literature, and can readily be used by a skilled person. Suitable polymerisation temperatures range up to 400° C., suitably from 80 to 350° C. and pressure from 70 MPa, suitably 100 to 400 MPa, suitably from 100 to 350 MPa. The high pressure polymerization is generally performed at pressures of 100 to 400 MPa and at temperatures of 80 to 350° C. Such processes are well known and well documented in the literature and will be further described later below.

The incorporation of the comonomer(s), preferably the polar comonomer and the silane group(s) containing units (b) as comonomer, as well as the control of the comonomer feed to obtain the desired final comonomer content can be carried out in a well-known manner and is within the skills of a skilled person.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

Such HP polymerisation results in a so called low density polymer of ethylene (LDPE), herein with the optional (polar) comonomer as defined above or in claims and with optional, and preferable silane group(s) containing comonomer as the silane group(s) containing units (b). The term LDPE has a well-known meaning in the polymer field and describes the nature of polyethylene produced in HP, i.e the typical features, such as different branching architecture, to distinguish the LDPE from PE produced in the presence of an olefin polymerisation catalyst (also known as a coordination catalyst). Although the term LDPE is an abbreviation for low density polyethylene, the term is understood not to limit the density range of the polymer (a), but covers the LDPE-like HP polyethylenes with low, medium and higher densities.

The additives (c) of the polymer composition are e.g. conventional additives suitable for the desired end application and within the skills of a skilled person, including without limiting to, preferably at least antioxidant(s) (for example sterically hindered phenols, phosphites/phosphonites, sulphur containing antioxidants, alkyl radical scavengers, aromatic amines, hindered amine stabilizers, or blends thereof) and UV light stabilizer(s) (for example hindered amine light stabilizers), and may also include scorch retardants, metal deactivator(s), nucleating agent(s), clarifier(s), brightener(s), acid scavenger(s), as well as slip agent(s) or talc etc, or any mixtures thereof. In this context fillers, which have a well-known meaning and are used in higher amounts for filler purpose, are not included in additives, but in further components (f), as described below. Each additive can be used e.g. in conventional amounts, the total amount of additives present in the polymer composition being preferably as defined above. Such additives are generally commercially available and are described, for example, in "Plastic Additives Handbook", 5th edition, 2001 of Hans Zweifel. In one embodiment the polymer composition is without a scorch retardant.

As to the optional tackifying resin (d), the term "tackifying resin" has a well-known meaning in the field. The optional tackifying resin (d) of the polymer composition can be a molecule or a macro-molecule. Generally it is a chemical compound or a polymer of fairly low molecular weight (Mw), compared to common polymers. The polymer can be from a natural source or from a chemical process or combination thereof. The tackifying resin generally enhances the adhesion of a final adhesive composition, e.g. hot melt adhesive or pressure sensitive adhesive composition. The tackifying resin (d), if present, is preferably selected from one or more of the commercial available tackifying agents. The choice of the tackifying resin (d) depends on the adhesive application and is within the skills of a skilled person. One preferable tackifying resin (d) is a C5-C10 aliphatic or aromatic hydrocarbon having a softening point 105° C. or less (ASTM D-6090-97). As an example of such tackifying resin (d) i.a. Escorez 1102 and Escorez 1304 supplied by ExxonMobil, or C5 aliphatic resins as Piccotac 1020-E, Piccotac 1095-N and Piccotac 1100-E supplied by Eastman, or C9 aromatic resins e.g. Picco A-10 and Picco A100 supplied by Eastman, can be mentioned.

In one embodiment the polymer composition preferably comprises a tackifying resin (d). Preferably, the amount of the tackifying resin (d) is 10 to 70 wt %, preferably 20 to 60 wt %, preferably 30 to 50 wt %, based on the total amount (100 wt %) of the polymer composition.

Accordingly, in a preferable embodiment (embodiment 1), the polymer composition as defined above, below or in claims preferably comprises:

10.0 to 80.0 wt %, preferably 20.0 to 70.0, preferably 20.0 to 60.0, preferably 25 to 50, wt % of a polymer of ethylene (a) bearing silane group(s) containing units (b);

0.01 to 5.0 wt %, preferably 0.05 to 4.0, preferably 0.05 to 3.0, preferably 0.01 to 2.0, wt % of additive(s) (c); and 10 to 70 wt %, preferably 20 to 60, preferably 30 to 50, wt %, a tackifying resin (d); and optionally one or more, or all, of the components (e) to (g), in any combination:

0 to 50 wt %, preferably 0 to 40, preferably 0 to 30, preferably 0 to 20, wt % of a plasticizer (e);

0 to 40 wt %, preferably 0 to 30 wt %, of a further component(s) (f) other than the polymer of ethylene (a), additive (c), tackifying resin (d) and plasticizer (e); and/or 0 to 0.1, preferably 0.00001 to 0.1, mol/(kg polymer of ethylene (a)) of a crosslinking agent (g); based on the total amount (100 wt %) of the polymer composition.

The optional plasticizer (e) of the polymer composition according to the present invention can be preferably selected from: mineral based oil, petroleum based oil, liquid resin, liquid elastomer, polybutene, polyisobutene, phthalate plasticizer, benzoate plasticizer, epoxidized soya oil, vegetal oil, olefin oligomer, low molecular weight polymer, solid plasticizer, wax and any mixtures thereof. The term "wax" refers to an organic substance having a weight average molecular weight (Mw, GPC) of <10000 g/mol, which is solid at normal temperature and becomes liquid when heated, and is commonly considered a "wax". There is not a particular limitation on the type of wax as long as the adhesive composition according to the invention can be obtained.

Examples of known and commercially available waxes are: micro crystalline wax, synthetic wax and paraffin wax, such as Licowax PE520, Licocene PE5301, Licocene PE4201, Licocene PP1602 available from Clariant. The optional other plasticizer (e) can also be e.g. a commercial plasticizer suitable for adhesive applications. As an example of such plasticizer (e) are Platinol series available from BASF (phthalate based plasticizers) can be mentioned.

The amount of the plasticizer (e), if present, is preferably 2.0 to 50 wt %, preferably 3.0 to 40 wt %, preferably 4.0 to 30 wt %, preferably 5.0 to 20 wt %, based on the total amount (100 wt %) of the polymer composition.

In one embodiment the plasticizer (e) is present in the polymer composition.

Accordingly, in another preferable embodiment (embodiment 2), the polymer composition as defined above, below or in claims preferably comprises:
- 10.0 to 80.0 wt %, preferably 20.0 to 70.0, preferably 20.0 to 60.0, preferably 25 to 50, wt % of a polymer of ethylene (a) bearing silane group(s) containing units (b);
- 0.01 to 5.0 wt %, preferably 0.05 to 4.0, preferably 0.05 to 3.0, preferably 0.01 to 2.0, wt % of additive(s) (c);
- 2.0 to 50 wt %, preferably 3.0 to 40, preferably 4.0 to 30, preferably 5.0 to 20, wt % of a plasticizer (e); and optionally one or more, or all, of the components (d), (f) and (g), in any combination:
- 0 to 70 wt %, preferably 0 to 60, preferably 0 to 55, preferably 0 to 50, wt % of a tackifying resin (d);
- 0 to 40 wt %, preferably 0 to 30 wt %, of a further component(s) (f) other than the polymer of ethylene (a), additive (c), tackifying resin (d) and plasticizer (e); and/or
- 0 to 0.1, preferably 0.00001 to 0.1, mol/(kg polymer of ethylene (a)) of a crosslinking agent (g); based on the total amount (100 wt %) of the polymer composition.

In one more preferable embodiment (embodiment 3), the polymer composition as defined above, below or in claims preferably comprises:
- 10.0 to 80.0 wt %, preferably 20.0 to 70.0, preferably 20.0 to 60.0, preferably 25 to 50, wt % of a polymer of ethylene (a) bearing silane group(s) containing units (b);
- 0.01 to 5.0 wt %, preferably 0.05 to 4.0, preferably 0.05 to 3.0, preferably 0.01 to 2.0, wt % of additive(s) (c);
- 10 to 70 wt %, preferably 20 to 60, preferably 30 to 50, wt %, a tackifying resin (d);
- 2.0 to 50 wt %, preferably 3.0 to 40, preferably 4.0 to 30, preferably 5.0 to 20, wt % of a plasticizer (e); and optionally one or two, or both, of the components (f) and (g), in any combination:
- 0 to 40 wt %, preferably 0 to 30 wt %, of a further component(s) (f) other than the polymer of ethylene (a), additive (c), tackifying resin (d) and plasticizer (e); and/or
- 0 to 0.1, preferably 0.00001 to 0.1, mol/(kg polymer of ethylene (a)) of a crosslinking agent (g); based on the total amount (100 wt %) of the polymer composition.

The further component(s) (f), if present, can be for instance a further polymer(s) other than the polymer of ethylene (a) and plasticizer (d); and/or a filler(s), e.g. any commercially available polymer commonly used for adhesive applications and compatible with the polymer (a) and other components of the polymer composition. The type of the optional further polymer(s) as the optional component (f) is not limited and can be chosen depending on the adhesive application and is within the skills of a skilled person. If present, then the amount of the polymer(s) as the optional further component(s) is preferably from 3 to 30.0 wt % based on the total amount (100 wt %) of the polymer composition. The further component(s) (f) can also be e.g. a filler, e.g. a commercially available filler product. The term "filler" has a well-known meaning in the field. If present, then the amount of the filler as the optional further component(s) (f) is preferably from 1.0 to 30.0 wt % based on the total amount (100 wt %) of the polymer composition. As examples of mineral fillers for instance the precipitated calcium carbonates (e.g. Calofort, Calopake and Multifex-MM available from Specialty Minerals Inc.), ground calcium carbonates, dolomites and talcs can be mentioned.

The amount of the further component(s) (f), if present in any of the above preferable polymer compositions, is preferably of 1.0 to 40.0 wt %, preferably 3.0 to 30.0 wt %, preferably 5.0 to 30.0 wt %, based on the total amount (100 wt %) of the polymer composition. The amount means the total amount of all further component(s) (f) present in the polymer composition.

Preferably no further polymer(s) as further component(s) (f) is present in the polymer composition. More preferably no further component(s) (f) is present in the polymer composition.

Preferably, the polymer composition is used in crosslinkable adhesive applications. More preferably the polymer composition, preferably at least the polymer (a), is crosslinkable. More preferably, the polymer composition, preferably at least the polymer (a), is crosslinked via the silane units (b). More preferably, the polymer composition, preferably at least the polymer (a), is crosslinked via the silane units (b) present in the polymer (a), more preferably present as a comonomer of the polymer (a).

The polymer composition which is crosslinked for instance using a crosslinking agent has a typical network, i.a. interpolymer crosslinks (bridges), as well known in the field. The crosslinking degree, expressed e.g. as Hot set elongation of the polymer composition, preferably of the polymer (a), may vary depending on the end application, as evident for a skilled person.

The polymer (a) has preferably a Permanent deformation (%) at 160° C. Hot-Set oven of 5.0% or less, preferably of 4.0% or less, preferably of 3.0% or less, suitably of 2.0% or less. Permanent deformation (%) at 160° C. Hot-Set oven is preferably of −5% or more, preferably of −2% or more, suitably of 0.0% or more. "−" refers to shrinkage.

The polymer (a) has preferably a Permanent deformation (%) at 200° C. Hot-Set oven of 10.0% or less, preferably of 8.0% or less, suitably of 6.0% or less. Permanent deformation (%) at 200° C. Hot-Set oven is preferably of −5% or more, preferably of −2% or more, suitably of 0.0% or more. "−" refers to shrinkage.

The inventive composition gives the option to select lower or higher elongation depending on the demands for the end application and substrates bonded.

Accordingly, in one preferable embodiment polymer composition, preferably at least the polymer (a) is crosslinked using a crosslinking agent (g). Thus the crosslinking agent (g) is preferably present in the polymer composition.

The optional and preferable crosslinking agent (g) is preferably a silanol condensation catalyst (SCC) which is selected from SCC group of tin-organic catalysts or aromatic organic sulphonic acids. Accordingly, the preferable hydrolysable silane groups containing units (b) can be crosslinked by hydrolysis and subsequent condensation in the presence of such silanol condensation catalyst (SCC) and H2O in a manner known in the art.

The preferable SCCs are typically commercially available product.

The silanol condensation catalyst (SCC), which is preferably used for crosslinking the polymer composition, preferably at least polymer (a), is more preferably selected from the group C of carboxylates of metals, such as tin, zinc, iron, lead and cobalt; from a titanium compound bearing a group hydrolysable to a Brönsted acid (preferably as described in WO 2011160964 of Borealis, included herein as reference), from organic bases; from inorganic acids; and from organic acids; suitably from carboxylates of metals, such as tin, zinc, iron, lead and cobalt, from titanium compound bearing a group hydrolysable to a Brönsted acid as defined above or from organic acids, suitably from dibutyl tin dilaurate (DBTL), dioctyl tin dilaurate (DOTL), particularly DOTL; titanium compound bearing a group hydrolysable to a Brönsted acid as defined above; or an aromatic organic sulphonic acid, which is suitably an organic sulphonic acid which comprises the structural element:

$$Ar(SO_3H)_x \qquad (II)$$

wherein Ar is an aryl group which may be substituted or non-substituted, and if substituted, then suitably with at least one hydrocarbyl group up to 50 carbon atoms, and x is at least 1; or a precursor of the sulphonic acid of formula (II) including an acid anhydride thereof or a sulphonic acid of formula (II) that has been provided with a hydrolysable protective group(s), e.g. an acetyl group that is removable by hydrolysis. Such organic sulphonic acids are described e.g. in EP736065, or alternatively, in EP1309631 and EP1309632.

More preferably, the polymer composition, preferably at least the polymer (a), is crosslinked using a silanol condensation catalyst (SCC) which is selected from the above group preferable group C of the SCC, preferably selected from carboxylates of tin or aromatic organic sulphonic acids.

The crosslinking agent (g), preferably SCC, can be subjected to the polymer composition e.g. before the application of the polymer composition on a substrate or during or after the production of the article of the invention. In case the crosslinking agent (g) is added during the production of the article of the invention, then said crosslinking agent (g) can e.g. be applied on a substrate separately, but simultaneously with the polymer composition.

Alternatively, it is also possible to add the crosslinking agent (g) e.g. to the substrate or any other layer of an optional multilayer structure of the article, which substrate or other layer is in contact with the adhesive layer formed from the polymer composition, whereby the crosslinking agent (g) migrates from the substrate or other layer to the polymer composition layer during or after the production of the article.

Preferably, the amount of the optional crosslinking agent (g) is of 0 to 0.1 mol/kg polymer of ethylene (a). Preferably the crosslinking agent (g) is present and in an amount of 0.00001 to 0.1, preferably of 0.0001 to 0.01, more preferably 0.0002 to 0.005, more preferably of 0.0005 to 0.005, mol/kg polymer of ethylene (a).

Accordingly, in further preferable embodiment (embodiment 4), the polymer composition as defined above, below or in claims preferably comprises:

10.0 to 80.0 wt %, preferably 20.0 to 70.0, preferably 20.0 to 60.0, preferably 25 to 50, wt % of a polymer of ethylene (a) bearing silane group(s) containing units (b);

0.01 to 5.0 wt %, preferably 0.05 to 4.0, preferably 0.05 to 3.0, preferably 0.01 to 2.0, wt % of additive(s) (c);

0.00001 to 0.1 mol/kg polymer of ethylene (a), preferably of 0.0001 to 0.01, more preferably 0.0002 to 0.005, more preferably of 0.0005 to 0.005, mol/kg polymer of ethylene (a) of a crosslinking agent (g); and optionally one or more, or all, of the components (d) to (f), in any combination:

0 to 70 wt %, preferably 0 to 60, preferably 0 to 55, preferably 0 to 50, wt % of a tackifying resin (d);

0 to 50 wt %, preferably 0 to 40, preferably 0 to 30, preferably 0 to 20, wt % of a plasticizer (e); and/or 0 to 40 wt %, preferably 0 to 30 wt %, of a further component(s) (f) other than the polymer of ethylene (a), additive (c), tackifying resin (d) and plasticizer (e); based on the total amount (100 wt %) of the polymer composition.

The crosslinking degree can be measured according to hot set measurement as described below under the "Determination methods".

More preferable embodiment (embodiment 5), the polymer composition as defined above, below or in claims is selected from:

10.0 to 80.0 wt %, preferably 20.0 to 70.0, preferably 20.0 to 60.0, preferably 25 to 50, wt % of a polymer of ethylene (a) bearing silane group(s) containing units (b);

0.01 to 5.0 wt %, preferably 0.05 to 4.0, preferably 0.05 to 3.0, preferably 0.01 to 2.0, wt % of additive(s) (c);

10 to 70 wt %, preferably 20 to 60, preferably 30 to 50, wt %, a tackifying resin (d);

0.00001 to 0.1 mol/kg polymer of ethylene (a), preferably of 0.0001 to 0.01, more preferably 0.0002 to 0.005, more preferably of 0.0005 to 0.005, mol/kg polymer of ethylene (a) of a crosslinking agent (g); and optionally one or two, or both, of the components (e) and (f), in any combination:

0 to 50 wt %, preferably 0 to 40, preferably 0 to 30, preferably 0 to 20, wt % of a plasticizer (e); and/or 0 to 40 wt %, preferably 0 to 30 wt %, of a further component(s) (f) other than the polymer of ethylene (a), additive (c), tackifying resin (d) and plasticizer (e); based on the total amount (100 wt %) of the polymer composition;

or 10.0 to 80.0 wt %, preferably 20.0 to 70.0, preferably 20.0 to 60.0, preferably 25 to 50, wt % of a polymer of ethylene (a) bearing silane group(s) containing units (b);

0.01 to 5.0 wt %, preferably 0.05 to 4.0, preferably 0.05 to 3.0, preferably 0.01 to 2.0, wt % of additive(s) (c);

2.0 to 50 wt %, preferably 3.0 to 40, preferably 4.0 to 30, preferably 5.0 to 20, wt % of a plasticizer (e);

0.00001 to 0.1 mol/kg polymer of ethylene (a), preferably of 0.0001 to 0.01, more preferably 0.0002 to 0.005, more preferably of 0.0005 to 0.005, mol/kg polymer of ethylene (a) of a crosslinking agent (g); and optionally one or more, or all, of the components (d) and (f), in any combination:

0 to 70 wt %, preferably 0 to 60, preferably 0 to 55, preferably 0 to 50, wt % of a tackifying resin (d); and/or 0 to 40 wt %, preferably 0 to 30 wt %, of a further component(s) (f) other than the polymer of ethylene (a), additive (c), tackifying resin (d) and plasticizer (d); based on the total amount (100 wt %) of the polymer composition.

In even more preferable embodiment (embodiment 6), the polymer composition comprises:
- 10.0 to 80.0 wt %, preferably 20.0 to 70.0, preferably 20.0 to 60.0, preferably 25 to 50, wt % of a polymer of ethylene (a) bearing silane group(s) containing units (b);
- 0.01 to 5.0 wt %, preferably 0.05 to 4.0, preferably 0.05 to 3.0, preferably 0.01 to 2.0, wt % of additive(s) (c);
- 10 to 70 wt %, preferably 20 to 60, preferably 30 to 50, wt %, a tackifying resin (d);
- 2.0 to 50 wt %, preferably 3.0 to 40, preferably 4.0 to 30, preferably 5.0 to 20, wt % of a plasticizer (e);
- 0.00001 to 0.1 mol/kg polymer of ethylene (a), preferably of 0.0001 to 0.01, more preferably 0.0002 to 0.005, more preferably of 0.0005 to 0.005, mol/kg polymer of ethylene (a) of a crosslinking agent (g); and optionally
- 0 to 40 wt %, preferably 0 to 30 wt % of a further component(s) (f) other than the polymer of ethylene (a), additive (c), tackifying resin (d) and plasticizer (e); based on the total amount (100 wt %) of the polymer composition.

It is most preferred embodiment (embodiment 7) the polymer composition comprises, preferably consists of:
- 10.0 to 80.0 wt %, preferably 20.0 to 70.0, preferably 20.0 to 60.0, preferably 25 to 50, wt % of a polymer of ethylene (a) bearing silane group(s) containing units (b);
- 0.01 to 5.0 wt %, preferably 0.05 to 4.0, preferably 0.05 to 3.0, preferably 0.01 to 2.0, wt % of additive(s) (c);
- 10 to 70 wt %, preferably 20 to 60, preferably 30 to 50, wt %, a tackifying resin (d);
- 2.0 to 50 wt %, preferably 3.0 to 40, preferably 4.0 to 30, preferably 5.0 to 20, wt % of a plasticizer (e);
- 0.00001 to 0.1 mol/kg polymer of ethylene (a), preferably of 0.0001 to 0.01, more preferably 0.0002 to 0.005, more preferably of 0.0005 to 0.005, mol/kg polymer of ethylene (a) of a crosslinking agent (g); based on the total amount (100 wt %) of the polymer composition.

"Polymeric component(s)" exclude herein any carrier polymer(s) of optional additive or filler product(s), e.g. master batch(es) of additive(s) or, respectively, filler(s) together with the carrier polymer, optionally present in the polymer composition of the polymeric layer. Such optional carrier polymer(s) are calculated to the amount of the respective additive or, respectively, filler based on the amount (100%) of the polymer composition.

Naturally, it is within the skills of a skilled person to choose the optional components (c) to (g) to be compatible with the polymer (a).

The polymer composition can be produced at least partly (i.e. at least part of the components (a) to (g)) separately before producing the article or in connection with the production process of said article.

The polymer composition is preferably used for adhesive applications, preferably as a hot melt adhesive composition or as a pressure sensitive adhesive composition for use in articles.

Article

The invention thus also provides an article comprising at least one substrate and a polymer composition, as defined above, below or in claims, on said substrate. Preferably the article comprises at least one substrate and an adhesive layer comprising, preferably consisting of, the polymer composition on said substrate.

The article preferably comprises a multilayer element comprising
- a substrate,
- an adhesive layer on said substrate and
- a top layer on said adhesive layer;

wherein the adhesive layer comprises the ethylene polymer composition as defined above, below or in claims.

It is to be understood herein that the adhesive layer can be continuous or discontinuous layer, as well-known for a skilled person in the art. Accordingly, the adhesive layer of the polymer composition can be applied on a substrate (or additionally to other optional layers of the article) continuously or discontinuously.

It is to be understood herein that the substrate and top layer can be in any order, i.e. the substrate can be the "inner layer" in the final article, then the top layer being the "outer" layer of the article, or vice versa. The decisive factor is that the adhesive layer is initially applied on the substrate and after that the top layer is introduced on the other surface of the adhesive layer. I.e. decisive is that adhesive layer is as "core layer" between the substrate layer and top layer.

Moreover, e.g. in case of adhesive tape, wherein the tape is winded into a form of tape roll, then it is to be understood that the other surface of the substrate which does not contain the adhesive layer functions as the top layer which is contacted with the other side of the adhesive layer. Or in case of non-woven fiber article, then the fiber forming the non-woven article serves both as a substrate and as a top layer, and the adhesive layer can be continuously or discontinuously applied in the non-woven fiber article. Accordingly, then the adhesive layer is continuously or discontinuously distributed in said non-woven article.

The multilayer element can optionally contain further layers in addition to substrate layer, adhesive layer and top layer. The further layers can be the same as or different from substrate layer or top layer. Moreover, the multilayer element can optionally contain further adhesive layers of the invention.

The substrate and the preferable top layer and optional other layers, if in contact with the further adhesive layer(s), can be any material suitable and compatible for the polymer composition. The choice of the substrate and optional further layers depends on the article and end application thereof and is within the skills of a skilled person. It is to be understood that the substrate and the preferable multilayer element of the article can be of any shape, wherein the substrate has a surface on which the polymer composition can be applied. The optional top layer can then be applied on said adhesive layer. As non-limiting examples of the substrate a fiber, a film, a thread, a strip, a textile, a coating, a foil, a sheet, a board, a plate, a band, a container, like a bottle, or a package can be mentioned, and can be produced using any techniques, e.g. by extrusion or moulding. Furthermore, as non-limiting examples of such substrate material and optional, and preferable, top layer material, for instance, non-woven material, polymeric, elastomeric, wood, glass, paper, carton, metal, concrete and ceramic material can be mentioned. Any substrate material, optional, and preferable, top layer material, and form thereof can be used in any combination with the composition of the invention as the adhesive layer.

In a preferable article of the invention the crosslinking agent (g) is present in the polymer composition. Accordingly, preferably the adhesive layer of the article of the invention comprises the crosslinking agent (g). In this embodiment it is preferred that the polymer composition of the adhesive layer of the article of the invention is crosslinked in the presence of the crosslinking agent (g).

The adhesive layer preferably comprises at least 70 wt %, preferably at least 80 wt %, preferably at least 90 wt %, preferably 90 to 100 wt %, preferably consists of, the polymer composition of the invention.

The invention further provides an adhesive layer comprising, preferably consisting of the polymer composition.

As said, it is understood that the multilayer element of the article may comprise further layers, depending on the desired end application of the article.

The article of the invention can be used in several adhesive applications. Illustrative adhesive applications of such an article include, but are not limited to, medical applications, construction applications, electrical applications, nonwoven material applications, food or general packaging applications, bookbinding applications, labelling, like bottle labelling applications and pressure sensitive applications. Accordingly, as non-limiting examples of the article of the invention, for instance a sanitary product, a medical or surgical device (such as a bandage or a surgical drape), a tape, a film, a label, a sheet element (for example a plastic, a paper or a nonwoven (multilayer) sheet element), a container, like a bottle (for example a plastic or glass bottle), food package (for example a box) or a can; a board element (for example a cardboard or a wooden board), a case, a furniture or part thereof, a construction element, a vehicle, a book, a bag, a filter, an electrical device, a construction element, a sportwear etc., can be mentioned.

As said, preferably, the polymer composition for the article can be produced at least partly separately before producing the article or in connection with the production process of said article. E.g. at least part of the components including polymer (a) of the polymer composition can be combined together by the producer of the adhesive composition who supplies said composition to article producer (if not the same). In such case the article producer can use the ready-made adhesive composition as such for producing the article or can introduce part of the components to the polymer composition during the article production process. Alternatively, the article producer can combine all the components of polymer composition before or in connection with the article production process.

The invention further provides a process for producing an article of the invention as defined above, below or in claims comprising the polymer composition of the invention as defined above, below or in claims, wherein the process comprises the steps of:

(i) mixing, preferably meltmixing the polymer (a), part or all of additive(s) (c) and part or all of the optional components (d) to (g) of the polymer composition of the invention as defined above, below or in claims, at elevated temperature to form a melt mix of the polymer composition;

(ii) applying the obtained melt mix of the polymer composition on at least one surface of a substrate to form an adhesive layer on the substrate; optionally (iii) subjecting a top layer on the formed adhesive layer; optionally (iv) crosslinking the adhesive layer in the presence of a crosslinking agent (g); and (v) recovering the obtained article.

Preferably, the process comprises the steps of:

(i) mixing, preferably meltmixing the polymer (a), part or all of additive(s) (c) and part or all of the optional components (d) to (g) of the polymer composition of the invention as defined above, below or in claims, at elevated temperature to form a melt mix of the polymer composition;

(ii) applying the obtained melt mix of the polymer composition on at least one surface of a substrate to form an adhesive layer on the substrate; optionally, and preferably, (iii) subjecting a top layer on the formed adhesive layer;

(iv) crosslinking the adhesive layer in the presence of a crosslinking agent (g); and (v) recovering the obtained article.

It is to be understood that all the components of the polymer composition can be added at step (i); or part of the components (c) and/or optional components (d) to (g), e.g. part or all of the additives (c) and the optional crosslinking agent (g), can be added to the polymer composition e.g. at time of step (ii) or (iii), like during step (ii) of the process. Alternatively, part of the components can also be introduced to the polymer composition after or during step (v). For instance, e.g. part of the additives (c) and/or crosslinking agent (g), e.g. crosslinking agent (g) may be previously introduced to the substrate and/or to the optional, and preferable, top layer, whereby after step (v) said component(s) (c) and/or (g) can migrate to the adhesive layer of the polymer composition from the substrate and/or the optional, and preferable, top layer of the article. All these alternatives are evident for a skilled person.

All these alternatives are evident for a skilled person.

Preferably, at least the optional, and preferable, crosslinking agent (g), is introduced to the polymer composition during the production of the article. Accordingly, the crosslinking agent (g) is preferably introduced to (the melt mix of) the polymer composition obtained from step (i) during step (ii) by applying at step (ii) the crosslinking agent (g) on the substrate separately, but simultaneously with the polymer composition obtained from step (i).

The term "meltmixing at elevated temperature" is well-known procedure for a skilled person in the field. Accordingly, "meltmixing at elevated temperature" means herein mixing above the melting or softening point of at least the major polymer component(s) of the obtained mixture and is carried out for example, without limiting to, in a temperature of at least 2 to 20° C. above the melting or softening point of polymer component(s). The melting point means melting temperature (Tm) according to determination method as described below under "Determination methods". The softening point of a material is the temperature at which a material softens sufficiently to allow significant flow under a low stress. Softening point of polymer component(s) is expressed herein as Vicat softening point as described below under "Determination methods".

The polymer composition is preferably produced by meltmixing the components in a conventional, e.g. commercially available, mixer, e.g. kneader, in a manner well-known for a skilled person. If desired, the production of the polymer composition may be carried out under inert atmosphere, by using an inert gas such as carbon dioxide or nitrogen, in order to protect said composition.

The resulting polymer composition may then be applied at the step (ii) on the substrate using a variety of coating techniques depending on the desired article/adhesive application as well-known and within the skills of a skilled person. Examples of coating techniques are: hot melt slot die coating, hot melt wheel coating, hot melt roller coating, melt blown coating and spiral spray coating. The application temperature at which the polymer composition is applied on a substrate during step (ii) is typically above the melting point (Tm) or softening point of the polymer composition and is within the skills of a skilled person. The application temperature at step (ii) can e.g. be selected to be above the melting point or softening point of the polymer (a) or the optional further polymer (f), which one has the highest softening or melting point and is the major polymeric component. Most preferably the application temperature of step (ii) is above the melting point of the polymer (a), which polymer (a) is preferably the major polymeric component of the polymer composition.

Accordingly, for the polymer composition according to this invention, the application temperature at step (ii) is preferably selected to be above the melting point of the main polymer component, which is most preferably the polymer (a). As an example, a suitable application temperature at step (a) can be between 70 to 130° C. depending on the type of polymer (a). The application temperature at step (ii) is suitably in the range from 2° C. to 20° C. above the melting point of the polymer (a) and can be chosen by a skilled person.

Determination Methods

Unless otherwise stated in the description or in the experimental part, the following methods were used for the property determinations of the polymer composition, polar polymer and/or any sample preparations thereof as specified in the text or experimental part.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene. MFR may be determined at different loadings such as 2.16 kg ($MFR_2$) or 5 kg ($MFR_5$).

Density

The density of the polymer was measured according to ISO 1183-2. The sample preparation was executed according to ISO 1872-2 Table 3 Q (compression moulding).

Comonomer Contents:

The Content (wt % and mol %) of Polar Comonomer Present in the Polymer and the Content (wt % and mol %) of Silane Group(s) Containing Units (Preferably Comonomer) Present in the Polymer Composition (Preferably in the Polymer):

Quantitative nuclear-magnetic resonance (NMR) spectroscopy was used to quantify the comonomer content of the polymer composition or polymer as given above or below in the context.

Quantitative $^1$H NMR spectra recorded in the solution-state using a Bruker Advance III 400 NMR spectrometer operating at 400.15 MHz. All spectra were recorded using a standard broad-band inverse 5 mm probehead at 100° C. using nitrogen gas for all pneumatics. Approximately 200 mg of material was dissolved in 1,2-tetrachloroethane-$d_2$ (TCE-$d_2$) using ditertiarybutylhydroxytoluen (BHT) (CAS 128-37-0) as stabiliser. Standard single-pulse excitation was employed utilising a 30 degree pulse, a relaxation delay of 3 s and no sample rotation. A total of 16 transients were acquired per spectra using 2 dummy scans. A total of 32 k data points were collected per FID with a dwell time of 60 µs, which corresponded to to a spectral window of approx. 20 ppm. The FID was then zero filled to 64 k data points and an exponential window function applied with 0.3 Hz line-broadening. This setup was chosen primarily for the ability to resolve the quantitative signals resulting from methylacrylate and vinyltrimethylsiloxane copolymerisation when present in the same polymer.

Quantitative $^1$H NMR spectra were processed, integrated and quantitative properties determined using custom spectral analysis automation programs. All chemical shifts were internally referenced to the residual protonated solvent signal at 5.95 ppm.

When present characteristic signals resulting from the incorporation of vinylacytate (VA), methyl acrylate (MA), butyl acrylate (BA) and vinyltrimethylsiloxane (VTMS), in various comonomer sequences, were observed (Randell89). All comonomer contents calculated with respect to all other monomers present in the polymer.

The vinylacytate (VA) incorporation was quantified using the integral of the signal at 4.84 ppm assigned to the *VA sites, accounting for the number of reporting nuclei per comonomer and correcting for the overlap of the OH protons from BHT when present:

$$VA = (I_{*VA} - (I_{ArBHT})/2)/1$$

The methylacrylate (MA) incorporation was quantified using the integral of the signal at 3.65 ppm assigned to the 1MA sites, accounting for the number of reporting nuclei per comonomer:

$$MA = I_{1MA}/3$$

The butylacrylate (BA) incorporation was quantified using the integral of the signal at 4.08 ppm assigned to the 4BA sites, accounting for the number of reporting nuclei per comonomer:

$$BA = I_{4BA}/2$$

The vinyltrimethylsiloxane incorporation was quantified using the integral of the signal at 3.56 ppm assigned to the 1VTMS sites, accounting for the number of reporting nuclei per comonomer:

$$VTMS = I_{1VTMS}/9$$

Characteristic signals resulting from the additional use of BHT as stabiliser, were observed. The BHT content was quantified using the integral of the signal at 6.93 ppm assigned to the ArBHT sites, accounting for the number of reporting nuclei per molecule:

$$BHT = I_{ArBHT}/2$$

The ethylene comonomer content was quantified using the integral of the bulk aliphatic (bulk) signal between 0.00-3.00 ppm. This integral may include the 1VA (3) and αVA (2) sites from isolated vinylacetate incorporation, *MA and αMA sites from isolated methylacrylate incorporation, 1BA (3), 2BA (2), 3BA (2), *BA (1) and αBA (2) sites from isolated butylacrylate incorporation, the *VTMS and αVTMS sites from isolated vinylsilane incorporation and the aliphatic sites from BHT as well as the sites from polyethylene sequences. The total ethylene comonomer content was calculated based on the bulk integral and compensating for the observed comonomer sequences and BHT:

$$E = (1/4)*[I_{bulk} - 5*VA - 3*MA - 10*BA - 3*VTMS - 21*BHT]$$

It should be noted that half of the α signals in the bulk signal represent ethylene and not comonomer and that an insignificant error is introduced due to the inability to compensate for the two saturated chain ends (S) without associated branch sites.

The total mole fractions of a given monomer (M) in the polymer was calculated as:

$$fM = M/(E + VA + MA + BA + VTMS)$$

The total comonomer incorporation of a given monomer (M) in mole percent was calculated from the mole fractions in the standard manner:

$$M [mol\%] = 100 * fM \quad (5)$$

The total comonomer incorporation of a given monomer (M) in weight percent was calculated from the mole fractions and molecular weight of the monomer (MW) in the standard manner:

$$M [wt\%] = 100*(fM*MW)/((fVA*86.09)+ \\ (fMA*86.09)+(fBA*128.17)+(fVTMS*148.23)+ \\ ((1-fVA-fMA-fBA-fVTMS)*28.05))$$

randall89: J. Randall, Macromol. Sci., Rev. Macromol. Chem. Phys. 1989, C29, 201.

If characteristic signals from other specific chemical species are observed the logic of quantification and/or compensation can be extended in a similar manor to that used for the specifically described chemical species. That is, identification of characteristic signals, quantification by integration of a specific signal or signals, scaling for the number of reported nuclei and compensation in the bulk integral and related calculations. Although this process is specific to the specific chemical species in question the approach is based on the basic principles of quantitative NMR spectroscopy of polymers and thus can be implemented by a person skilled in the art as needed.

Rheological Properties:

Dynamic Shear Measurements (Frequency Sweep Measurements)

The characterisation of melt of polymer composition or polymer as given above or below in the context by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where $\sigma_0$ and $\gamma_0$ are the stress and strain amplitudes, respectively
$\omega$ is the angular frequency
$\delta$ is the phase shift (loss angle between applied strain and stress response)
t is the time Dynamic test results are typically expressed by means of several different rheological functions, namely the shear storage modulus G', the shear loss modulus, G", the complex shear modulus, G*, the dynamic shear viscosity, $\eta^*$, the dynamic shear viscosity, $\eta'$, the out-of-phase component of the complex shear viscosity $\eta''$ and the loss tangent, tan $\delta$ which can be expressed as follows:

$$G' = \frac{\sigma_0}{\gamma_0}\cos\delta [Pa] \quad (3)$$

$$G'' = \frac{\sigma_0}{\gamma_0}\sin\delta [Pa] \quad (4)$$

$$G^* = G' + iG'' [Pa] \quad (5)$$

$$\eta^* = \eta' - i\eta'' [Pa.s] \quad (6)$$

$$\eta' = \frac{G''}{\omega} [Pa.s] \quad (7)$$

$$\eta'' = \frac{G'}{\omega} [Pa.s] \quad (8)$$

Besides the above mentioned rheological functions one can also determine other rheological parameters such as the so-called elasticity index EI(x). The elasticity index EI(x) is the value of the storage modulus, G' determined for a value of the loss modulus, G" of x kPa and can be described by equation (9).

$$EI(x) = G' \text{ for } (G''=x \text{ kPa}) [Pa] \quad (9)$$

For example, the EI(5 kPa) is the defined by the value of the storage modulus G', determined for a value of G" equal to 5 kPa.

Shear Thinning Index ($SHI_{0.05/300}$) is defined as a ratio of two viscosities measured at frequencies 0.05 rad/s and 300 rad/s, $\mu_{0.05}/\mu_{300}$.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362

[2] The influence of molecular structure on some rheological properties of polyethylene", Heino, E. L., Borealis Polymers Oy, Porvoo, Finland, Annual Transactions of the Nordic Rheology Society, 1995).

[3] Definition of terms relating to the non-ultimate mechanical properties of polymers, Pure & Appl. Chem., Vol. 70, No. 3, pp. 701-754, 1998.

The Softening Point is Expressed as Vicat Softening Temperature: The Determination of Vicat Softening Temperature Softening point for soft plastics can be measured according to ISO 306:2013 standard method; on specimen type plaque 240×240×4 mm, conditioning time 96 hrs or more, heating rate 50K/h, load 10N.

Melting Temperature, Crystallization Temperature ($T_{cr}$), and Degree of Crystallinity The melting temperature Tm of the used polymers was measured in accordance with ASTM D3418. Tm and Tcr were measured with Mettler TA820 differential scanning calorimetry (DSC) on 3+−0.5 mg samples. Both crystallization and melting curves were obtained during 10° C./min cooling and heating scans between −10 to 200° C. Melting and crystallization temperatures were taken as the peaks of endotherms and exotherms. The degree of crystallinity was calculated by comparison with heat of fusion of a perfectly crystalline polymer of the same polymer type, e.g. for polyethylene, 290 J/g.

Tensile properties; Tensile test was measured according to ISO 527-2/5A/250. Crosshead speed for testing the tensile strength and elongations was 250 mm/min.

Test specimen produced as described in EN ISO 1872-2, specimen type: 5A to ISO 527-2 were used. The specimens were made from film tapes for the polymer 8a) of the invention and from compressed plaques for the comparative examples (given below in the experimental part).

Preparation of Film Tape Samples (for Tensile Property Measurements of Polymer (a)):

The polymer (a) was blended with (for crosslinked samples) or without (for non-crosslinked samples) a cross-linking agent (g) which was a sulphonic acid silane condensation catalyst. The amount of the catalyst was of $2.3 \times 10^{-3}$ mol catalyst/kg polymer composition. The blending was carried out in Brabender mixer at 125° C., kneading time 20 min. The obtained mixture was grinded to pellets and the obtained grinded pellets were used for tape extrusion in Collin E20T extruder. The temperature settings in three zones were adjusted to 160, 180 and 180° C. The die was adjusted to 1.7 mm. No water cooling was used only air to avoid the precross-linking of the tapes. The extruded film tapes with a thickness of 1.7+−0.1 mm were die cut and the dumbbell specimens for tensile measurements were produced as described above under this "Tensile properties" using the film tape samples. The produced dumbbell specimens were crosslinked at 90° C. for 16 hrs in water bath for measurements from crosslinked samples (XL) or were used directly for measuring tensile property measurements from non-crosslinked samples (UNXL).

Preparation of Compression plaque samples (for tensile property measurements of comparative examples (given below in the experimental part): Compressed plaques are prepared as follows: Pellets of the comparative composition were soaked with dicumyl peroxide (CAS no. 80-43-3) as the crosslinking agent. The soaked pellets used for compression moulding into plaques as follows: The press was preheated to set temperature, above the melting temperature of used polymer (herein at 180° C.). The pellets were put in the press and the pressure was increased to 20 bar, and kept at the pressure for selected temperatures and times. The plaques were cooled down to room temperature at rate of 15° C./min at 20 bars. The thickness of the obtained plaques was 1.7+−0.1 mm, at this conditions the plaques were crosslinked (XL). Non-noncrosslinked plaques for (UNXL) were prepared in the same way as crosslinked plaques, however without soaking with crosslinked agent. The crosslinked and non-crosslinked plaques were die cut and the dumbbell specimens for tensile measurements were produced as described above under this "Tensile properties" using the compressed plaque samples.

"strain 0.05" definition; The specimens prepared and tested according to ISO 527-2/5A/250 standard. The term "strain 0.05" means: First, since the stress-strain curves of the polymer (a) of the present invention do not demonstrate a linear elastic behaviour, the best fit straight line was applied to the steepest slope of the curve and the cross-section point on x-axis taken as a new origin of the curve, i.e. at this point x-Axis=0 and y-Axis=0, compare FIG. 1(a), so that the stress-strain curve can be represented as shown on FIG. 1(b). No extensometer was used.

The changes of the distance between the crosshead grips holding the specimen is noted and taken as changes of specimen gauge length according to ISO 527-2/5A. The initial gauge length of the specimen, i.e. 20 mm at the initial point of the stress-strain curve, is used as the initial length of the specimen in the strain calculation. This means herein that the change of the distance between the grips of 1 mm corresponds to a specimen strain of 0.05. The automatic data recording on tensile machine always started once the load reached 2N (so called preload).

Secant E-modulus; Straight line is fitted between origin and the point on stress-strain curve corresponding to 0.05 of strain, FIG. 1b, and the secant E-modulus corresponds to the slope of this line.

Offset yield point; the cross-section point between the straight line and stress-strain curve corresponding to 0.05 of strain is taken as offset yield point, FIG. 1b.

In the below experimental part the samples were non-crosslinked or crosslinked.

Hot set measurement;

First, the test specimen in dumbbell form prepared according to ISO 527-2/5A were taken by already cross-linked film tapes prepared as described above. The hot set elongation as well as the permanent deformation was determined according to IEC 60811-2-1 on test specimen samples as prepared as described above. In this hot set test, a dumbbell of the tested material is equipped with a weight corresponding to a stress of 20 N/cm2. This loaded specimen is put into an oven either at 160° C. or at 200° C., as given in text above or below, and after 15 minutes, the elongation is measured based on the gauge length. Subsequently, the weight is removed and the sample is allowed to relax in oven for 5 minutes at 160° C. or at 200° C., as given above or below. Then, the sample is taken out from the oven and cooled down to room temperature. The permanent deformation in % is determined according to the formula; (L1−L0)*(100/L1). Where L0 is the initial gauge length 20 mm for ISO 527-2/5A and L1 is the gauge length after the relaxation in oven for 5 min at 160° C. or at 200° C., as given in above or below.

EXPERIMENTAL PART

Preparation of Inventive Polymer Examples (Copolymer of Ethylene with Methyl Acrylate or, Respectively, Butyl Acrylate Comonomer and with Vinyl Trimethoxysilane Comonomer)

Polymerisation of the Polymer (a), Inv. Ex.1-Inv. Ex5

Inventive polymer (a) was produced in a commercial high pressure tubular reactor at a pressure 2500-3000 bar and max temperature 250-300° C. using conventional peroxide initiator. Ethylene monomer, methyl acrylate (MA) or, respectively, butyl acrylate (BA) polar comonomer and vinyl trimethoxy silane (VTMS) comonomer (silane group (s) containing comonomer (b)) were added to the reactor system in a conventional manner. CTA was used to regulate MFR as well known for a skilled person. After having the information of the property balance desired for the inventive final polymer (a), the skilled person can control the process to obtain the inventive polymer (a).

The amount of the vinyl trimethoxy silane units, VTMS, (=silane group(s) containing units), the amount of MA or, repectively BA, and $MFR_2$ are given in the table 1.

The properties in below tables were measured from the polymer (a) as obtained from the reactor or from a layer sample as indicated below.

TABLE 1

Product properties of Inventive Examples

| | Test polymer | | | | |
|---|---|---|---|---|---|
| | Inv. Ex. 1 EBAVTMS-1 | Inv. Ex 2 EBAVTMS-2 | Inv. Ex 3 EMAVTMS-1 | Inv. Ex 4 EMAVTMS-2 | Inv. Ex 5 EMAVTMS-3 |
| Properties of the polymer obtained from the reactor | | | | | |
| $MFR_{2,16}$, g/10 min | 0.5 | 4.8 | 16 | 2.5 | 2.5 |
| acrylate content, (wt %) | 12.5 BA | 17 BA | 21 MA | 21 MA | 22 MA |
| Melt Temperature, °C. | 99 | 95 | 89 | 91.9 | 91 |
| VTMS content, (wt %) | 1.05 | 1.75 | 1.2 | 1.8 | 0.6 |
| Density, kg/m³ | 922 | 922 | 944.7 | 947.7 | 945.3 |
| SHI (0.05/300), 150° C. | | | 5600 | | |

In above table 1 MA denotes the content of methyl acrylate comonomer present in the polymer, BA denotes the content of butyl acrylate comonomer present in the polymer, and VTMS content denotes the content of vinyl trimethoxy silane comonomer present in the polymer.

Comparative Examples

Elvaloy® AC1224: commercial available copolymer of ethylene and methyl acrylate comonomer supplied by Dupont. Methyl acrylate (MA) content of 24 wt % and $MFR_2$ (190° C./2.16 kg) of 2 g/10 min Elvax® 265: is an ethylene-vinyl acetate copolymer of ethylene and vinyl acetate comonomer supplied by Dupont. Vinyl acetate (VA) content of 28 wt % and $MFR_2$ (190° C./2.16 kg) of 3 g/10 min.

In the below tables UNXL means non-crosslinked and XL means crosslinked sample. The sample preparation is described above under "Determination methods" in connection with "Tensile properties".

Crosslinking agent (g): for crosslinking of inventive examples (XL) silane condensation catalyst which is sulphonic acid is used. The catalyst was used in said crosslinking samples in amount of $2.3 \times 10^{-3}$ mol catalyst/kg polymer composition.

The crosslinking agent for crosslinking the comparative examples Elvaloy® AC1224 and Elvax® 265 examples (XL) was peroxide, dicumyl peroxide (CAS no. 80-43-3) which was used in amount of 1.3 wt % based on the amount of Elvaloy® AC1224 and, respectively, Elvax® 265.

TABLE 2

Secant E-modulus

| | | Secant E-modulus (for strain 0.05), MPa | | | | |
|---|---|---|---|---|---|---|
| | | −20° C. | | +23° C. | | +95° C. |
| | | UNXL | XL | UNXL | XL | UNXL | XL |
| 1. | EBAVTMS-1 | 83.00 | 103.12 | 34.99 | 40.80 | 0.30 | 0.63 |
| 2. | EBAVTMS-2 | 62.62 | 65.64 | 21.92 | 25.58 | — | 0.67 |
| 3. | EMAVTMS-1 | 45.76 | 53.45 | 11.10 | 12.41 | — | 0.54 |
| 4. | EMAVTMS-2 | 48.68 | 44.42 | 13.03 | 13.31 | — | 1.33 |
| 5. | EMAVTMS-3 | 49.69 | 61.09 | 10.30 | 14.32 | — | 0.34 |
| 6. | Elvaloy AC1224 | 45.56 | 32.94 | 10.82 | 9.49 | — | 0.51 |
| 7. | Elvax 265A | 52.23 | 39.17 | 9.20 | 9.22 | — | 0.78 |

No values for UNXL at 95° C. since melting point is below +95° C.

TABLE 3

Secant E-modulus ratio

| | | Secant E-modulus ratio | | | | | |
|---|---|---|---|---|---|---|---|
| | | −20° C./+23° C. | | −20° C./+95° C. | | +23° C./+95° C. | |
| | | UNXL | XL | UNXL | XL | UNXL | XL |
| 1. | EBAVTMS-1 | 2.37 | 2.53 | 278.69 | 162.66 | 117.49 | 64.35 |
| 2. | EBAVTMS-2 | 2.86 | 2.57 | — | 98.00 | — | 38.18 |
| 3. | EMAVTMS-1 | 4.12 | 4.31 | — | 98.29 | — | 22.82 |
| 4. | EMAVTMS-2 | 3.74 | 3.34 | — | 33.45 | — | 10.03 |
| 5. | EMAVTMS-3 | 4.83 | 4.27 | — | 181.20 | — | 42.48 |

TABLE 3-continued

Secant E-modulus ratio

| | | Secant E-modulus ratio | | | | |
|---|---|---|---|---|---|---|
| | | −20° C./+23° C. | | −20° C./+95° C. | | +23° C./+95° C. |
| | | UNXL | XL | UNXL | XL | UNXL | XL |
| 6. | Elvaloy AC1224 | 4.21 | 3.47 | — | 64.18 | — | 18.49 |
| 7. | Elvax 265A | 5.68 | 4.25 | — | 50.32 | — | 11.85 |

No values for UNXL at 95° C. since melting point is below +95° C.

TABLE 4

Tensile strength at offset yield point (TSY) at −20° C., 23° C. and 95° C.

| | | Tensile strength at offset yield point (for strain 0.05) (MPa) | | | | | |
|---|---|---|---|---|---|---|---|
| | | −20° C. | | +23° C. | | +95° C. | |
| | | UNXL | XL | UNXL | XL | UNXL | XL |
| 1. | EBAVTMS-1 | 4.150 | 5.156 | 1.749 | 2.040 | 0.015 | 0.032 |
| 2. | EBAVTMS-2 | 3.131 | 3.282 | 1.096 | 1.279 | — | 0.033 |
| 3. | EMAVTMS-1 | 2.288 | 2.673 | 0.555 | 0.620 | — | 0.027 |
| 4. | EMAVTMS-2 | 2.434 | 2.221 | 0.652 | 0.666 | — | 0.066 |
| 5. | EMAVTMS-3 | 2.485 | 3.054 | 0.515 | 0.716 | — | 0.017 |
| 6. | Elvaloy AC1224 | 2.278 | 1.647 | 0.541 | 0.474 | — | 0.026 |
| 7. | Elvax 265A | 2.611 | 1.959 | 0.461 | 0.460 | — | 0.039 |

No values for UNXL at 95° C. since melting point is below +95° C.

TABLE 5

Tensile strength at offset yield point ratio for −20° C./23° C. and −20° C./95° C.;

| | Ratio for tensile strength at offset yield point | −20° C./+23° C. | | −20° C./+95° C. | |
|---|---|---|---|---|---|
| | | UNXL | XL | UNXL | XL |
| 1. | EBAVTMS-1 | 2.4 | 2.5 | 278.7 | 162.7 |
| 2. | EBAVTMS-2 | 2.9 | 2.6 | — | 98.0 |
| 3. | EMAVTMS-1 | 4.1 | 4.3 | — | 98.3 |
| 4. | EMAVTMS-2 | 3.7 | 3.3 | — | 33.4 |
| 5. | EMAVTMS-3 | 4.8 | 4.3 | — | 181.2 |
| 6. | Elvaloy AC1224 | 4.2 | 3.5 | — | 64.2 |
| 7. | Elvax 265A | 5.7 | — | — | — |

No values for UNXL at 95° C. since melting point is below +95° C.

TABLE 6

Flexibility = SAY/(TSY * E) as defined in above in the specification at −20° C., 23° C. and 95° C. (for strain 0.05); SAY is the strain at offset yield point = 0.05

| | | Flexibility at offset yield point*$10^5$ (for strain 0.05), 1/MPa$^2$ | | | | | |
|---|---|---|---|---|---|---|---|
| | | −20° C. | | +23° C. | | +95° C. | |
| | | UNXL | XL | UNXL | XL | UNXL | XL |
| 1. | EBAVTMS-1 | 15 | 15 | 82 | 60 | 1127500 | 248835 |
| 2. | EBAVTMS-2 | 25 | 23 | 208 | 153 | — | 222878 |
| 3. | EMAVTMS-1 | 48 | 35 | 812 | 650 | — | 338139 |
| 4. | EMAVTMS-2 | 42 | 51 | 589 | 564 | — | 56694 |
| 5. | EMAVTMS-3 | 40 | 27 | 943 | 488 | — | 879872 |
| 6. | Elvaloy AC1224 | 48 | 33 | 855 | 1111 | — | 379692 |
| 7. | Elvax 265A | 37 | 65 | 1175 | 1182 | — | 165003 |

No values for UNXL at 95° C. since melting point is below +95° C.

TABLE 7

Modulus of resilience TSY$^2$/(2*E); max energy absorbed per unit volume in the elastic part of stress-strain curve;

| | | Modulus of resilience at offset yield point*100 (for strain 0.05), MPa (or J/m$^3$) | | | | | |
|---|---|---|---|---|---|---|---|
| | | −20° C. | | +23° C. | | +95° C. | |
| | | UNXL | XL | UNXL | XL | UNXL | XL |
| 1. | EBAVTMS-1 | 10.375 | 12.890 | 4.374 | 5.100 | 0.037 | 0.079 |
| 2. | EBAVTMS-2 | 7.828 | 8.205 | 2.740 | 3.197 | — | 0.084 |
| 3. | EMAVTMS-1 | 5.720 | 6.682 | 1.387 | 1.551 | — | 0.068 |
| 4. | EMAVTMS-2 | 6.085 | 5.553 | 1.629 | 1.664 | — | 0.166 |
| 5. | EMAVTMS-3 | 6.212 | 7.636 | 1.287 | 1.790 | — | 0.042 |
| 6. | Elvaloy AC1224 | 5.694 | 4.117 | 1.352 | 1.186 | — | 0.064 |
| 7. | Elvax 265A | 6.529 | 4.896 | 1.156 | 1.147 | — | 0.097 |

No values for UNXL at 95° C. since melting point is below +95° C.

Hot Melt Adhesive (HMA) Composition of the Invention:

Example 1

70 wt % of EMAVTMS-1 blended with 30 wt % of tackifying resin (d) which is Escorez 1102 supplied by ExxonMobil (aliphatic hydrocarbon with softening point of 99.5° C., and crosslinking agent (g) is a silane condensation catalyst which is sulphonic acid. The catalyst was used in in amount of 2.3×10$^{-3}$ mol catalyst/kg polymer composition.

Example 2

60 wt % of EMAVTMS-2 blended with 40 wt % of tackifying resin (d) which is Escorez 1304 (aliphatic hydrocarbon with softening point of 100° C.) supplied by ExxonMobil, and crosslinking agent (g) is a silane condensation catalyst which is sulphonic acid. The catalyst was used in in amount of 2.3×10$^{-3}$ mol catalyst/kg polymer composition.

Test Article:

A layer element consisting of Al-sheet (thickness of 0.5 mm) as substrate layer, Al-sheet (thickness of 0.5 mm) as a top layer and HMA composition of the invention according to above example 1 as the adhesive layer between the substrate and top layers. A hot melt of the composition of example 1 was produced in a pot at a temperature of 110° C.-140° C. by mixing all other components. The obtained hot melt was applied on a substrate layer by spraying and the top layer was then subjected on the formed adhesive layer of the HMA composition of example 1.

Hot-Set—Elastic Recovery (Permanent Deformation)

| Inv. Example | MFR, g/ 10 min | UNXL vs XL | Elong. after 2 min, % | Elong. after 15 min, % | Permanent deformation, % |
|---|---|---|---|---|---|
| 1. EBAVTMS-1 | 0.5 | UNXL | 78 | 79.6 | 8.1 |
|  |  | XL | 31 | 28.5 | 0.3 |
| 2. EBAVTMS-2 | 4.8 | UNXL | 56.1 | 55 | 5.7 |
|  |  | XL | 22 | 21.7 | 1.3 |
| 3. EMAVTMS-1 | 16 | UNXL | 41.8 | 40.7 | 2.9 |
|  |  | XL | 25.9/24* | 26/23* | 0.1/3* |
| 4. EMAVTMS-2 | 2.5 | UNXL | 17.1 | 16.7 | 1.6 |
|  |  | XL | 13/12.4* | 13.4/12.6* | 1.3/2.8* |
| 5. EMAVTMS-3 | 2.5 | UNXL | 80.8 | 85.5 | 6.2 |
|  |  | XL | 58.1/51* | 60.9/50.5* | 2.4/5.1* |

All samples measured at 160° C. under stress 20 N/cm2.
*Values measured at 200° C. under stress 20 N/cm2.

As seen in the example, the Hot Set properties of UNXL materials compared to XL materials show:

High values of elastic recovery (low permanent deformation) for cross-linked materials in comparison to thermoplastic; which demonstrates a higher resistance against permanent deformation after release of mechanical stress.

For the cross-linked materials the following is observed:

Low VTMS content demonstrating higher permanent deformation which means lower values of elastic recovery; 5XL versus all other XL samples High silane content is beneficial for low values of elongation under the load at high temperature conditions (200° C.); 4XL vs 3XL and 5XL High MFR values are (somewhat surprising) preferable for high values of elastic recovery, 3XL vs 4XL, for the lower range of VTMS contents tested.

The invention claimed is:

1. An ethylene polymer composition for adhesive applications comprising:
   (a) a polymer of ethylene containing one or mor polar comonomer(s) selected from (C1-C6)-alkyl acrylate and (C1-C6)-alkyl (C1-C6)-alkylacrylate comonomer(s), wherein the polymer of ethylene (a) bears;
   (b) silane group(s) containing units;
   and which polymer composition further comprises:
   (c) additive(s); and
   one or more, or all, of the components (d) to (g), in any combination:
   (d) a tackifying resin;
   (e) a plasticizer;
   (f) a further component(s) other than the polymer of ethylene (a), additive (c), tackifying resin (d) and plasticizer (e); and/or
   (g) a crosslinking agent; and
   wherein the polymer of ethylene (a) has one or two of the following properties:
   a Secant E-modulus at −20° C. (for strain 0.05) of at least 20 MPa when measured from Dumbbell specimens consisting of a polymer of ethylene (a) (ISO 527-2/5A/250; and/or
   a Secant E-modulus at −20° C. (for strain 0.05) of at least 35 MPa when measured from Dumbbell specimens consisting of a crosslinked polymer of ethylene (a) (ISO 527-2/5A/250, cross-linked at 90° C. in water bath for 16 hrs.

2. The polymer composition according to claim 1, wherein the polymer of ethylene (a) has:
   a Secant E-modulus at −20° C. (for strain 0.05) of 20 to 250, MPa when measured from Dumbbell specimens consisting of a polymer of ethylene (a) (ISO 527-2/5A/250; and/or,
   a Secant E-modulus at −20° C. (for strain 0.05) of 35 to 250, MPa when measured from Dumbbell specimens consisting of a crosslinked polymer of ethylene (a) (ISO 527-2/5A/250, cross-linked at 90° C. in water bath for 16 hrs.

3. The polymer composition according to claim 1, wherein the polymer of ethylene (a) has:
   a Secant E-modulus at 95° C. (for strain 0.05) of at least 0.1 MPa when measured from Dumbbell specimens consisting of a crosslinked polymer of ethylene (a) (ISO 527-2/5A/250, cross-linked at 90° C. in water bath for 16 hrs.

4. The polymer composition according to claim 1, wherein the polymer of ethylene (a) has:
   a ratio of Secant E-modulus at −20° C. (for strain 0.05) to Secant E-modulus at 95° C. (for strain 0.05) (when measured from Dumbbell specimens consisting of a crosslinked polymer of ethylene (a) (ISO 527-2/5A/250, cross-linked at 90° C. in water bath for 16 hrs) of 250 or less.

5. The polymer composition according to claim 1, wherein the polymer of ethylene (a) has:
   a Tensile strength at offset yield point (MPa) at −20° C. (for strain 0.05) of 10 or less MPa when measured from Dumbbell specimens consisting of a crosslinked polymer of ethylene (a) (ISO 527-2/5A/250, cross-linked at 90° C. in water bath for 16 hrs)
   a Tensile strength at offset yield point (MPa) at 95° C. (for strain 0.05) of at least 0.01, MPa when measured from Dumbbell specimens consisting of a crosslinked polymer of ethylene (a) (ISO 527-2/5A/250, cross-linked at 90° C. in water bath for 16 hrs).

6. The polymer composition according to claim 1, wherein the polymer of ethylene (a) has:
   a ratio of Tensile strength at offset yield point (MPa) at −20° C. (for strain 0.05) to Tensile strength at offset yield point (MPa) at 95° C. (for strain 0.05) (when measured from Dumbbell specimens consisting of a crosslinked polymer of ethylene (a) (ISO 527-2/5A/250, cross-linked at 90° C. in water bath for 16 hrs) of less than 250.

7. The polymer composition according to claim 1, wherein the polymer of ethylene (a) has:
   Flexibility$_{-20}$ (1/MPa$^2$) at −20° C. at least 15, when calculated according to the following equation ($A_{-20}$):

$$\text{Flexibility}_{-20} = \text{SAY} \ast 100000/(\text{TSY} \ast E)(A_{-20}) \text{ (at } -20° \text{ C.), and}$$

Flexibility$_{+95}$ (1/MPa$^2$) at +95° C. of 900000 or less, when calculated according to the following equation ($A_{+95}$):

$$\text{Flexibility}_{+95} = \text{SAY} \ast 100000/(\text{TSY} \ast E)(A_{+95}) \text{ (at } +95° \text{ C.)}$$

wherein in equation ($A_{-20}$) and equation ($A_{+95}$):
   SAY is the strain at offset yield point=0.05 (at −20° C. and, respectively at +95° C.) (when measured from Dumbbell specimens consisting of a crosslinked polymer of ethylene (a) (ISO 527-2/5A/250, cross-linked at 90° C. in water bath for 16 hrs),
   TSY is the tensile strength at offset yield point value (for strain 0.05, at −20° C. and, respectively at +95° C.), in MPa (when measured from Dumbbell specimens consisting of a crosslinked polymer of ethylene (a) (ISO 527-2/5A/250, cross-linked at 90° C. in water bath for 16 hrs), and E is the Secant E-modulus value (for strain 0.05, at −20° C. and, respectively at +95° C.), in MPa (when measured from Dumbbell specimens consisting of a crosslinked polymer of ethylene (a) (ISO 527-2/5A/250, cross-linked at 90° C. in water bath for 16 hrs).

8. The polymer composition according to claim 1, wherein the polymer of ethylene (a) has:

Modulus of resilience$_{-20}$ (MPa or J/m$^3$) at −20° C. of at least 2, when calculated according to the following equation (B-20):

Modulus of resilience$_{-20}$=TSY$^2$/(2*E)(B$_{-20}$), and

Modulus of resilience$_{+95}$ (MPa or J/m$^3$) at +95° C. of at least 0.01, when calculated according to the following equation (B$_{+95}$):

Modulus of resilience$_{+95}$=TSY$^2$/(2*E)(B$_{+95}$), wherein in equation (B$_{-20}$) and equation (B$_{+95}$):

TSY is the tensile strength at yield point value (for strain 0.05 at −20° C. and, respectively at +95° C.), in MPa (when measured from Dumbbell specimens consisting of a crosslinked polymer of ethylene (a) (ISO 527-2/5A/250, cross-linked at 90° C. in water bath for 16 hrs), and E is the Secant E-modulus value (for strain 0.05 at −20° C. and, respectively at +95° C.), in MPa (when measured from Dumbbell specimens consisting of a crosslinked polymer of ethylene (a) (ISO 527-2/5A/250, cross-linked at 90° C. in water bath for 16 hrs).

9. The polymer composition according to claim 1, comprising:

10.0 to 80.0 wt %, of a polymer of ethylene (a) bearing silane group(s) containing units (b);

0.01 to 5.0 wt %, of additive(s) (c); and one or more, or all, of the components (d) to (g), in any combination:

0 to 70 wt %, of tackifying resin (d);

0 to 50 wt %, of a plasticizer (e);

0 to 50 wt %, of a further component(s) (f) other than the polymer of ethylene (a), additive (c), tackifying resin (d) and plasticizer (e); and/or 0 to 0.1 mol/(kg polymer composition) of a crosslinking agent (g); based on the total amount (100 wt %) of the polymer composition.

10. The polymer composition according to claim 1, comprising a tackifying resin (d) in an amount of 10 to 70 wt %, based on the total amount (100 wt %) of the polymer composition.

11. The polymer composition according to claim 1, comprising a plasticizer (e) in the amount of 2.0 to 50 wt %, based on the total amount (100 wt %) of the polymer composition.

12. The polymer composition according to claim 1, wherein the silane group(s) containing units (b) are copolymerized or grafted to the polymer (a) using a hydrolysable unsaturated silane compound represented by the formula (I):

R1SiR2$q$Y3-$q$     (I)

wherein

R1 is an ethylenically unsaturated hydrocarbyl, hydrocarbyloxy or (meth)acryloxy hydrocarbyl group, each R2 is independently an aliphatic saturated hydrocarbyl group, Y which may be the same or different, is a hydrolysable organic group and q is 0, 1 or 2 wherein the silane group(s) containing unit (b) is present in the polymer of ethylene (a), the silane group(s) containing units (b) which are present in the polymer of ethylene (a) as a comonomer, or the silane group(s) containing unit (b) are present in the polymer of ethylene (a) in an amount of at least 0.06 to 2 mol %.

13. The polymer composition according to claim 1, wherein the polar comonomer is present in the polymer of ethylene (a) in an amount of 2.5 to 18 mol %, when measured by quantitative NMR, the polar comonomer is selected from (C1-C6)-alkyl acrylate comonomer or the polymer of ethylene (a) is produced by polymerisation in a high pressure polymerisation process using a radical initiator.

14. The polymer composition according to-claim 1, wherein the polymer composition is crosslinkable and includes a crosslinking agent (g) in an amount of 0.00001 to 0.1 mol/kg polymer of ethylene (a).

15. The polymer composition according to-claim 1, wherein the optional crosslinking agent (g) is selected from a silanol condensation catalyst (SCC), which is selected from the group C of carboxylates of metals; from a titanium compound bearing a group hydrolysable to a Brönsted acid, from organic bases; from inorganic acids; and from organic acids.

16. An article comprising at least one substrate and a polymer composition according to claim 1, on said substrate.

17. The article according to claim 16, which comprises a multilayer element comprising:

a substrate, an adhesive layer on said substrate and a top layer on said adhesive layer;

wherein the adhesive layer comprises the ethylene polymer composition.

18. The article according to claim 16, wherein the cross-linking agent (g) is present in the polymer composition and the polymer composition is crosslinked in the presence of the crosslinking agent (g).

19. A process for producing an article according to claim 16, wherein the process comprises the steps of:

(i) mixing the polymer (a), part or all of additive(s) (c) and part or all of the optional components (d) to (g) of the polymer composition at elevated temperature to form a melt mix of the polymer composition;

(ii) applying the obtained melt mix of the polymer composition on at least one surface of a substrate to form an adhesive layer on the substrate; optionally (iii) applying a top layer on the formed adhesive layer;

(iv) optionally crosslinking the adhesive layer in the presence of a crosslinking agent (g); and (v) recovering the obtained article.

* * * * *